(12) United States Patent
Hannuksela

(10) Patent No.: US 12,069,308 B2
(45) Date of Patent: Aug. 20, 2024

(54) APPARATUS, A METHOD AND A COMPUTER PROGRAM FOR HANDLING RANDOM ACCESS PICTURES IN VIDEO CODING

(71) Applicant: Nokia Technologies Oy, Espoo (FI)

(72) Inventor: Miska Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 299 days.

(21) Appl. No.: 17/610,819

(22) PCT Filed: May 14, 2020

(86) PCT No.: PCT/FI2020/050323
§ 371 (c)(1),
(2) Date: Nov. 12, 2021

(87) PCT Pub. No.: WO2020/229734
PCT Pub. Date: Nov. 19, 2020

(65) Prior Publication Data
US 2022/0217406 A1 Jul. 7, 2022

Related U.S. Application Data

(60) Provisional application No. 62/848,798, filed on May 16, 2019.

(51) Int. Cl.
*H04N 19/70* (2014.01)
*H04N 19/159* (2014.01)
(Continued)

(52) U.S. Cl.
CPC .......... *H04N 19/70* (2014.11); *H04N 19/172* (2014.11); *H04N 19/30* (2014.11)

(58) Field of Classification Search
CPC ...... H04N 19/70; H04N 19/30; H04N 19/169; H04N 19/159
(Continued)

(56) References Cited

U.S. PATENT DOCUMENTS

| | | | |
|---|---|---|---|
| 2010/0172405 A1 | 7/2010 | Kapoor | |
| 2015/0341552 A1 | 11/2015 | Chen et al. | |

(Continued)

FOREIGN PATENT DOCUMENTS

| | | |
|---|---|---|
| CN | 102771081 A | 11/2012 |
| CN | 105340271 A | 2/2016 |

(Continued)

OTHER PUBLICATIONS

"Research On Low Complexity Coding And Low Bitrate Coding For High Efficiency Video Coding", HEVC, China Academic Journal Electronic Publishing House, Mar. 2017, 80 pages.

(Continued)

*Primary Examiner* — Jeffery A Williams
(74) *Attorney, Agent, or Firm* — Harrington & Smith

(57) ABSTRACT

There is disclosed a method, an apparatus and a computer program product for video encoding and decoding. In accordance with an embodiment the method comprises obtaining an intra random access point picture from a first location of a coded video bitstream and determining whether the intra random access point picture is reusable in at least a second location of the coded video bitstream, the at least second location differing from the first location. If the determining indicates that the intra random access point picture is reusable, providing an identification assigned with the intra random access point picture that the intra random access point picture is a reusable intra random access point picture.

14 Claims, 8 Drawing Sheets

IRAP picture, pic_output_flag = 1

IRAP picture, pic_output_flag = 0

Random Access Segment

(51) Int. Cl.
*H04N 19/169* (2014.01)
*H04N 19/172* (2014.01)
*H04N 19/30* (2014.01)

(58) Field of Classification Search
USPC .................................................. 375/240.12
See application file for complete search history.

(56) References Cited

U.S. PATENT DOCUMENTS

| | | | |
|---|---|---|---|
| 2016/0219301 | A1 | 7/2016 | Pettersson et al. ............... 19/58 |
| 2016/0234144 | A1 | 8/2016 | Hannuksela et al. |
| 2016/0373771 | A1 | 12/2016 | Hendry et al. |
| 2018/0146225 | A1 | 5/2018 | Hannuksela et al. |
| 2018/0302618 | A1* | 10/2018 | Choi ....................... H04N 19/30 |

FOREIGN PATENT DOCUMENTS

| | | |
|---|---|---|
| CN | 105765978 A | 7/2016 |
| CN | 106165426 A | 11/2016 |
| CN | 106464891 A | 2/2017 |
| WO | 2017/140946 A1 | 8/2017 |

OTHER PUBLICATIONS

Extended European Search Report received for corresponding European Patent Application No. 20805647.3, dated Mar. 2, 2023, 12 pages.
Shen et al., "Restricted Multiple Reference Frames with Long Term Frame Buffer", Panasonic Singapore Laboratories Pte Ltd, Study Group 16 Question 6 Video Coding Experts Group (VCEG), VCEG-049, 15th Meeting, Dec. 3-7, 2001, 10 pages.
Sullivan et al., "Consent: H.265 (V4) "High efficiency video coding" (Rev.)", Rapporteur Q6/16, ITU Study Group 16, TD 558 (PLEN/16), May 23-Jun. 3, 2016, 702 pages.
Office action received for corresponding Indian Patent Application No. 202147057844, dated May 31, 2022, 6 pages.
Yu et al., "Video coding based on cross RAP referencing (CRR)", Joint Video Experts Team (JVET) of ITU-T SG 16 WP 3 and ISO/IEC JTC 1/SC 29/WG 11, JVET-M0360-v4, 13th Meeting, Jan. 9-18, 2019, pp. 1-6.
Wang et al., "AHG17: EDR—external decoding refresh", Joint Video Experts Team (JVET) of ITU-T SG 16 WP 3 and ISO/IEC JTC 1/SC 29/WG 11, JVET-N0119-v2, 14th Meeting, Mar. 19-27, 2019, pp. 1-4.
"Versatile Video Coding", Series H: Audiovisual and Multimedia Systems Infrastructure of audiovisual services—Coding of moving video, Recommendation ITU-T H.266, Aug. 2020, 516 pages.
"Information Technology—Coding Of Audio-Visual Objects—Part 15: Advanced Video Coding (AVC) File Format", ISO/IEC 14496-15, First edition, Apr. 15, 2004, 29 pages.
U.S. Appl. No. 62/813,612, "An Apparatus, A Method and a Computer Program for Delivering Constituent Bitstreams", filed Mar. 4, 2019, pp. 1-108.
"Advanced Video Coding For Generic Audiovisual services", Series H: Audiovisual And Multimedia Systems, Infrastructure of audio-visual services—Coding of moving Video, Recommendation ITU-T H.264, Apr. 2017, 812 pages.

"High Efficiency Video Coding", Series H: Audiovisual And Multimedia Systems, Infrastructure of audiovisual services—Coding of moving video, Recommendation ITU-T H.265, Feb. 2018, 692 pages.
"Parameter Values for Ultra-High Definition Television Systems for Production And International Programme Exchange", Recommendation ITU-R BT.2020, Aug. 2012, 7 pages.
"Parameter Values for the HDTV Standards for Production and International Programme Exchange", Recommendation ITU-R BT.709-6, Jun. 2015, 19 pages.
"Information Technology—Coding Of Audio-Visual Objects—Part 12: ISO Base Media File Format", ISO/IEC 14496-12, Fifth edition, Dec. 15, 2015, 248 pages.
"Information Technology—Coding Of Audio-Visual Objects—Part 14: MP4 File Format", ISO/IEC 14496-14, First edition, Nov. 15, 2003, 18 pages.
"3rd Generation Partnership Project; Technical Specification Group Services and System Aspects; Transparent end-to-end packet switched streaming service (PSS); 3GPP file format (3GP) (Release 15)", 3GPP TS 26.244, V15.0.0, Jun. 2018, pp. 1-67.
"3rd Generation Partnership Project; Technical Specification Group Services and System Aspects; Transparent end-to-end Packet-switched Streaming Service (PSS); Protocols and codecs (Release 15)", 3GPP TS 26.234, V15.1.0, Sep. 2018, pp. 1-174.
"Information Technology—Dynamic Adaptive Streaming over HTTP (Dash)—Part 1: Media Presentation Description and Segment Formats", ISO/IEC 23009-1, Second Edition, May 15, 2014, 152 pages.
"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 16)", 3GPP TS 26.247, V16.1.0, Dec. 2018, pp. 1-138.
Myers et al., "The Content-MD5 Header Field", RFC 1864, Network Working Group, Oct. 1995, pp. 1-4.
"Video back-channel messages for conveyance of status information and requests from a video receiver to a video sender", Series H: Audiovisual And Multimedia Systems, Infrastructure of audiovisual services—Coding of moving Video, Recommendation ITU-T H.271, May 2006, 22 pages.
Pantos et al., "HTTP Live Streaming", RFC 8216, Independent Submission, Aug. 2017, pp. 1-60.
Handley et al., "SDP: Session Description Protocol", RFC 4566, Network Working Group, Jul. 2006, pp. 1-49.
International Search Report and Written Opinion received for corresponding Patent Cooperation Treaty Application No. PCT/FI2020/050323, dated Oct. 13, 2020, 16 pages.
Pettersson et al., "AHG17: Dependent random access point pictures in VVC", Joint Video Experts Team (JVET) of ITU-T SG 16 WP 3 and ISO/IEC JTC 1/SC 29/WG 11, JVET-N0494-v3, 14th Meeting, Mar. 19-27, 2019, pp. 1-8.
Hannuksela et al., "AHG12: Sub-picture layers for realizing independently coded picture regions", Joint Video Experts Team (JVET) of ITU-T SG 16 WP 3 and ISO/IEC JTC 1/SC 29/WG 11, JVET-N0045, 14th Meeting, Mar. 19-27, 2019, pp. 1-13.
Ikai et al., "On independent layer", Joint Collaborative Team on Video Coding (JCT-VC) of ITU-T SG 16 WP 3 and ISO/IEC JTC 1/SC 29/WG 11, JCTVC-O0062_r2, 15th Meeting, Oct. 23-Nov. 1, 2013, pp. 1-8.

* cited by examiner

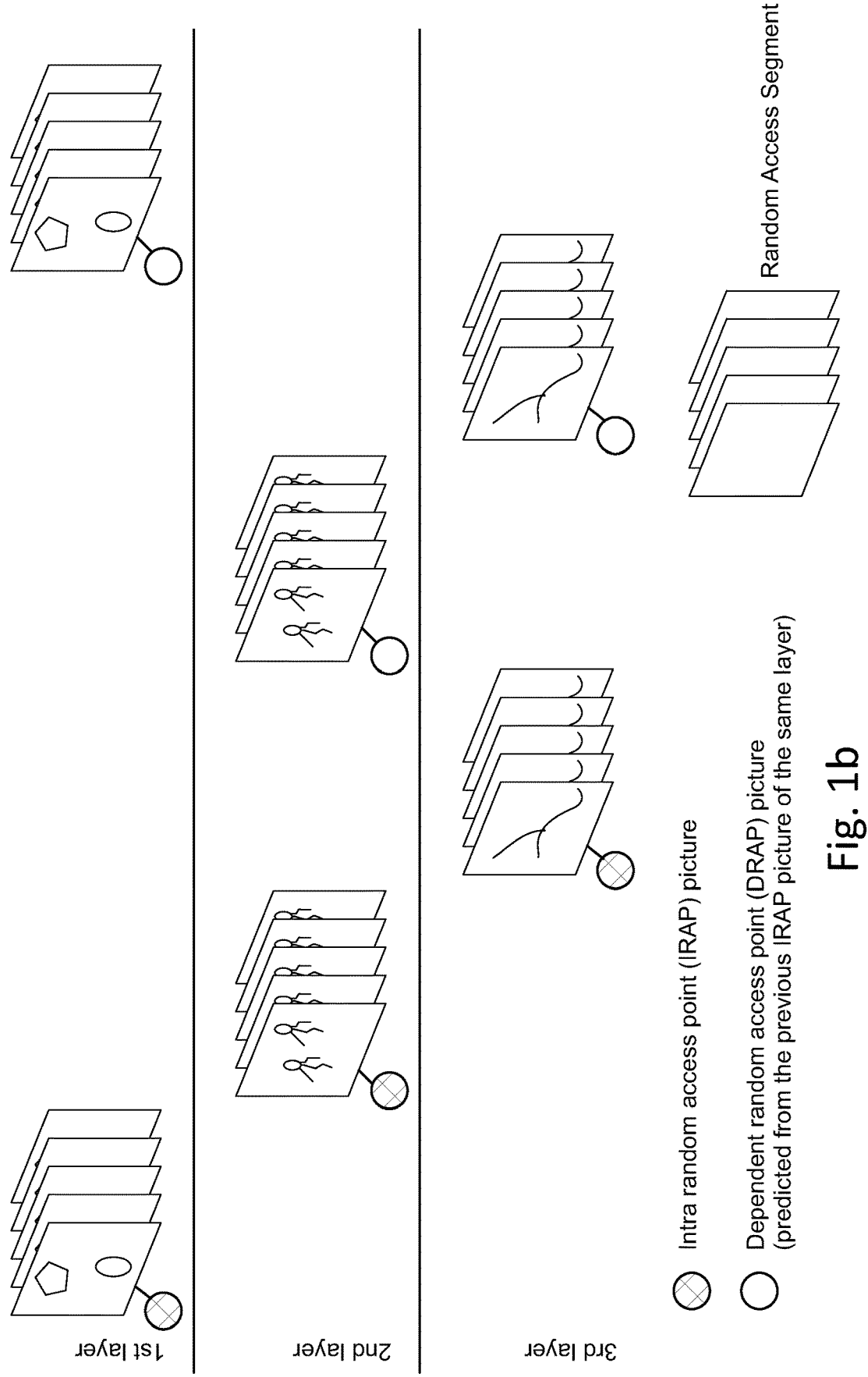

APPARATUS, A METHOD AND A COMPUTER PROGRAM FOR HANDLING RANDOM ACCESS PICTURES IN VIDEO CODING

RELATED APPLICATION

This application claims priority to PCT Application No. PCT/FI2020/050323, filed on May 14, 2020, which claims priority to U.S. Application No. 62/848,798, filed on May 16, 2019 the contents of which is incorporated herein by reference in its entirety.

TECHNICAL FIELD

The present invention relates to an apparatus, a method and a computer program for video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Many types of content may be captured with several cameras, which may be temporally interleaved to produce a video sequence to be encoded. Such temporally interleaved shots from different cameras may exist for example in movies, sitcoms, late-night talk shows, conferencing, and surveillance. Temporally non-adjacent shots originating from the same camera may have substantial similarity or correlation. However, since each shot conventionally starts with a random-access picture, the similarity between the shots has not been utilized in conventional video compression.

Some problems have been identified in some approaches which take advantage of cross-shot correlation

SUMMARY

Now in order to at least alleviate the above problems, an enhanced encoding method is introduced herein. There is provided embodiments for re-using random access pictures multiple times in video coding and decoding. In some embodiments there is provided a method, apparatus and computer program product for re-using random access pictures multiple times.

A random-access segment (RAS) may be defined as a sequence of coded pictures that starts, in decoding order, with a random-access picture. It may be, but in some cases needs not be, specified that no other picture than the first picture in a RAS is a random-access picture. For example, in some cases, the duration of random-access segments is constant and random-access pictures may also appear in the middle of a RAS.

A random-access picture may be defined as a picture that does not refer to any pictures other than itself as a reference for prediction in its decoding process and may impose a constraint for subsequent picture in decoding and output order such that those pictures do not refer to any pictures preceding the random-access picture in decoding order as a reference for prediction in their decoding process.

While concepts specific to HEVC and/or H.266/VVC are used in describing several embodiments, similar aspects may be used with any video codec. For example, rather than using the term an intra random access point (IRAP) picture, the term random-access picture may also be used.

The encoding according to an embodiment is performed in a manner that selected IRAP pictures (hereafter "reusable IRAP pictures") are repeated in the encoded bitstream. Likewise, the decoding according to an embodiment may be arranged in a manner that reusable IRAP pictures are repeated in the bitstream to be decoded. Thus, reusable IRAP pictures may appear repeatedly in a conventional video bitstream (likewise DASH Representation, or alike). However, transmission of the reusable IRAP pictures multiple times can be avoided by systems means as described in this specification.

Reusable IRAP pictures might only be used as a reference for prediction and not for displaying. This may be controlled by an encoder in or along the bitstream, e.g. with pic_output_flag of HEVC and H.266/VVC. For example, when the value of the pic_output_flag assigned with a reusable IRAP picture is 0, the reusable IRAP picture will not be displayed, and when the value of the pic_output_flag assigned with a reusable IRAP picture is 1, the reusable IRAP picture may be displayed.

Some embodiments may be illustrated with FIG. 1a. The pictures starting a RAS and indicated with the same symbol (circle/square/triangle) are the same reusable IRAP pictures. In FIG. 1a, there are three pairs of IRAP pictures that are identical, the first pair (circle, hashed circle) in the first and sixth RASs, the second pair (square, hashed square) in the second and fourth RASs, and the third pair (triangle, hashed triangle) in the third and fifth RASs. In this example, the reusable IRAP pictures of the first to third RASs are assigned with pic_output_flag having value 1 indicating that these pictures may be output, and the reusable IRAP pictures of the fourth to sixth RASs are assigned with pic_output_flag having value 0 indicating that these pictures need not be output but may be used as a reference.

A method according to a first aspect comprises:
  obtaining an intra random access point picture from a first location of a coded video bitstream;
  determining whether the intra random access point picture is reusable in at least a second location of the coded video bitstream, the at least second location differing from the first location;
  if the determining indicates that the intra random access point picture is reusable, providing an identification assigned with the intra random access point picture that the intra random access point picture is a reusable intra random access point picture.

A method according to a second aspect comprises:
encoding pictures to multiple layers, wherein the encoding comprises:
selecting a layer for each picture among the pictures;
encoding said each picture into a coded picture within the layer, wherein the encoding is independent of other layers; and
including temporally correlated pictures into a same independent layer, wherein pictures within the independent layer are not predicted from pictures of other layers.

An apparatus according to a third aspect comprises at least one processor and at least one memory including computer program code, the memory and the computer program code configured to, with the at least one processor, cause the apparatus to perform at least the following:
obtain an intra random access point picture from a first location of a coded video bitstream;
determine whether the intra random access point picture is reusable in at least a second location of the coded video bitstream, the at least second location differing from the first location;
provide an identification assigned with the intra random access point picture that the intra random access point picture is a reusable intra random access point picture, if the determining indicates that the intra random access point picture is reusable.

A non-transitory computer program product according to a fourth aspect comprises computer program code configured to, when executed on at least one processor, cause an apparatus or a system to:
obtain an intra random access point picture from a first location of a coded video bitstream;
determine whether the intra random access point picture is reusable in at least a second location of the coded video bitstream, the at least second location differing from the first location;
provide an identification assigned with the intra random access point picture that the intra random access point picture is a reusable intra random access point picture, if the determining indicates that the intra random access point picture is reusable.

An apparatus according to a fifth aspect comprises:
a first circuitry configured to obtain an intra random access point picture from a first location of a coded video bitstream;
a second circuitry configured to determine whether the intra random access point picture is reusable in at least a second location of the coded video bitstream, the at least second location differing from the first location;
a third circuitry configured to provide an identification assigned with the intra random access point picture that the intra random access point picture is a reusable intra random access point picture, if the determining indicates that the intra random access point picture is reusable.

A method according to a sixth aspect comprises:
receiving an identification associated with the intra random access point picture in a first location of a coded video bitstream, the identification indicating whether the an intra random access point picture is reusable in at least a second location of the coded video bitstream, the at least second location differing from the first location;
if the identification indicates that the intra random access point picture is reusable, examining whether a corresponding, previously received intra random access point picture is available;
if the examination reveals that the corresponding, previously received intra random access point picture is available, omitting processing the intra random access point picture.

An apparatus according to a seventh aspect comprises at least one processor and at least one memory including computer program code, the memory and the computer program code configured to, with the at least one processor, cause the apparatus to perform at least the following:
receive an identification associated with the intra random access point picture in a first location of a coded video bitstream, the identification indicating whether the an intra random access point picture is reusable in at least a second location of the coded video bitstream, the at least second location differing from the first location;
examine whether a corresponding, previously received intra random access point picture is available, if the identification indicates that the intra random access point picture is reusable;
omit processing the intra random access point picture, if the examination reveals that the corresponding, previously received intra random access point picture is available.

An apparatus according to an eighth aspect comprises at least one processor and at least one memory including computer program code, the memory and the computer program code configured to, with the at least one processor, cause the apparatus to perform at least the following:
a first circuitry configured to receive an identification associated with the intra random access point picture in a first location of a coded video bitstream, the identification indicating whether the an intra random access point picture is reusable in at least a second location of the coded video bitstream, the at least second location differing from the first location;
a second circuitry configured to examine whether a corresponding, previously received intra random access point picture is available, if the identification indicates that the intra random access point picture is reusable;
a third circuitry configured to omit processing the intra random access point picture, if the examination reveals that the corresponding, previously received intra random access point picture is available.

An apparatus according to a ninth aspect comprises:
means for obtaining an intra random access point picture from a first location of a coded video bitstream;
means for determining whether the intra random access point picture is reusable in at least a second location of the coded video bitstream, the at least second location differing from the first location;
means for providing an identification assigned with the intra random access point picture that the intra random access point picture is a reusable intra random access point picture, if the determining indicates that the intra random access point picture is reusable.

An apparatus according to a tenth aspect comprises:
means for receiving an identification associated with the intra random access point picture in a first location of a coded video bitstream, the identification indicating whether the an intra random access point picture is reusable in at least a second location of the coded video bitstream, the at least second location differing from the first location;
means for examining whether a corresponding, previously received intra random access point picture is available, if the identification indicates that the intra random access point picture is reusable;

means for omitting processing the intra random access point picture, if the examination reveals that the corresponding, previously received intra random access point picture is available.

A method according to an eleventh aspect comprises:
decoding pictures encoded to multiple layers from a bitstream, wherein the decoding comprises;
selecting a layer for each picture among the pictures;
decoding said each picture from a coded picture within the layer, wherein the decoding is independent of other layers; and
including temporally correlated, decoded pictures into a same independent layer, wherein pictures within the independent layer are not predicted from pictures of other layers.

The further aspects relate to apparatuses and computer readable storage media stored with code thereon, which are arranged to carry out the above methods and one or more of the embodiments related thereto.

BRIEF DESCRIPTION OF THE DRAWINGS

For better understanding of the present invention, reference will now be made by way of example to the accompanying drawings in which:

FIG. 1b shows an example of including pictures into several layers;

DETAILED DESCRIPTION OF SOME EXAMPLE EMBODIMENTS

Figure 1A:
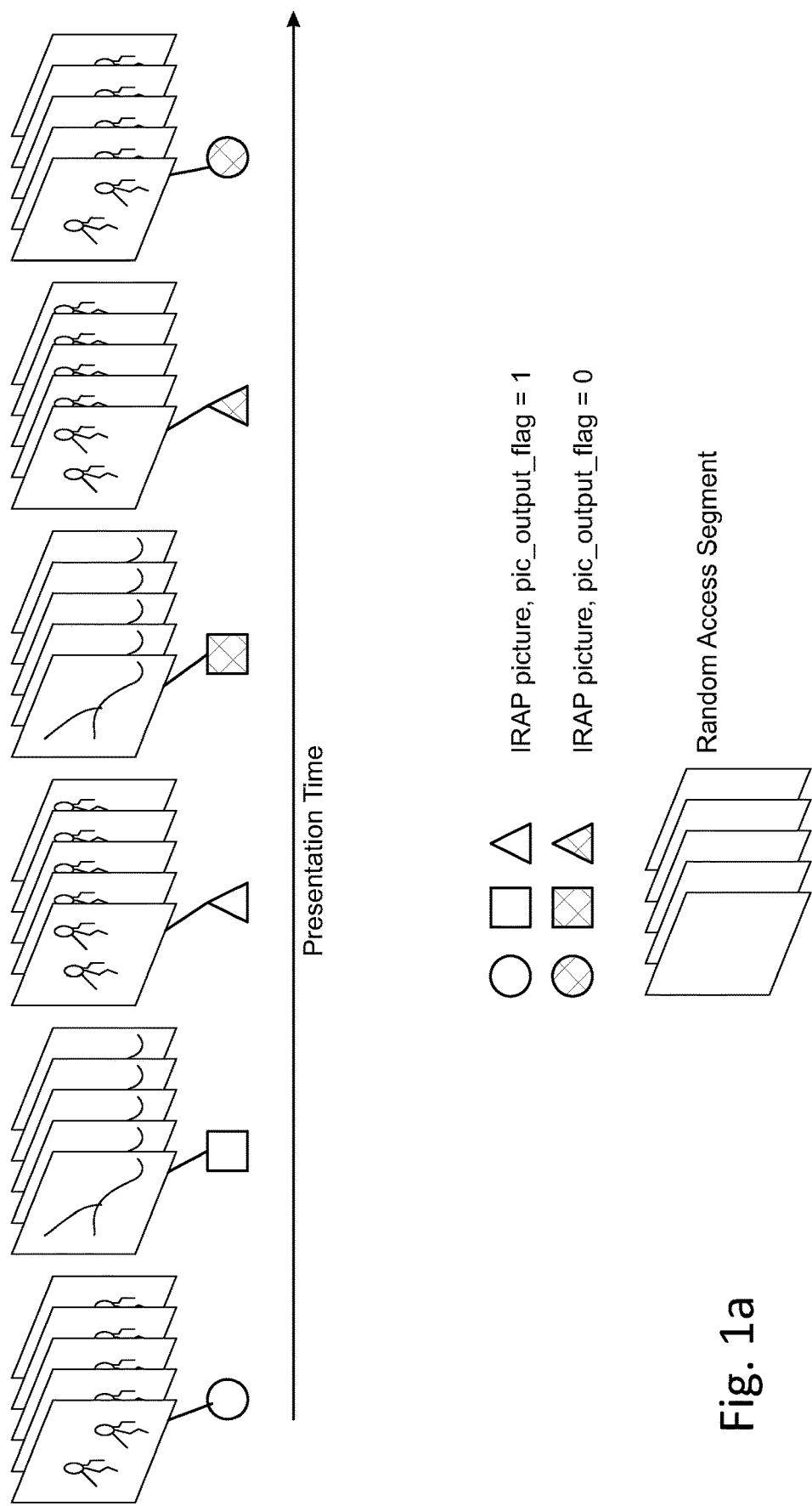
FIG. 1a shows an example sequence of pictures some of which are reusable.

In the following, several embodiments will be described in the context of one video coding arrangement. It is to be noted, however, that embodiments are not limited to this particular arrangement. For example, some embodiments may be applicable to video coding systems like streaming system, DVD (Digital Versatile Disc) players, digital television receivers, personal video recorders, systems and computer programs on personal computers, handheld computers and communication devices, as well as network elements such as transcoders and cloud computing arrangements where video data is handled.

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments. Thus, use of any such terms should not be taken to limit the spirit and scope of the embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

In the following, several embodiments are described using the convention of referring to (de)coding, which indicates that the embodiments may apply to decoding and/or encoding.

The Advanced Video Coding standard (which may be abbreviated AVC or H.264/AVC) was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organization for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding standard (which may be abbreviated HEVC or H.265/HEVC) was developed by the Joint Collaborative Team-Video Coding (JCT-VC) of VCEG and MPEG. The standard is published by both parent standardization organizations, and it is referred to as ITU-T Recommendation H.265 and ISO/IEC International Standard 23008-2, also known as MPEG-H Part 2 High Efficiency Video Coding (HEVC). Extensions to H.265/HEVC include scalable, multiview, three-dimensional, and fidelity range extensions, which may be referred to as SHVC, MV-HEVC, 3D-HEVC, and REXT, respectively. The references in this description to H.265/HEVC, SHVC, MV-HEVC, 3D-HEVC and REXT that have been made for the purpose of understanding definitions, structures or concepts of these standard specifications are to be understood to be references to the latest versions of these standards that were available before the date of this application, unless otherwise indicated.

The Versatile Video Coding standard (VVC, H.266, or H.266/VVC) is presently under development by the Joint Video Experts Team (JVET), which is a collaboration between the ISO/IEC MPEG and ITU-T VCEG.

Some key definitions, bitstream and coding structures, and concepts of H.264/AVC, HEVC, VVC, and some of their extensions are described in this section as an example of a video encoder, decoder, encoding method, decoding method, and a bitstream structure, wherein the embodiments may be implemented. The aspects of various embodiments are not limited to H.264/AVC or HEVC or VVC or their extensions, but rather the description is given for one possible basis on top of which the present embodiments may be partly or fully realized. Whenever VVC or any of its draft versions are referred to below, it needs to be understood that the description matches a VVC draft specification, that there might be changes in later draft versions and the finalized version(s) of VVC, and that descriptions and embodiments may be adjusted to match the finalized version(s) of VVC.

Video codec may comprise an encoder that transforms the input video into a compressed representation suited for storage/transmission and a decoder that can uncompress the compressed video representation back into a viewable form. The compressed representation may be referred to as a bitstream or a video bitstream. A video encoder and/or video decoder may also be separate from each other, i.e. need not form a codec. The encoder may discard some information in the original video sequence in order to represent the video in a more compact form (that is, at lower bitrate).

Hybrid video codecs, for example ITU-T H.264, may encode the video information in two phases. At first, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Then, the prediction error, i.e. the difference between the predicted block of pixels and the original block of pixels, is coded. This may be done by transforming the difference in pixel values using a specified transform (e.g. Discreet Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction or current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

FIG. 8a shows a block diagram of a video encoder suitable for employing embodiments of the invention. FIG. 8a presents an encoder for two layers, but it would be appreciated that presented encoder could be similarly simplified to encode only one layer or extended to encode more than two layers. FIG. 8a illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 8a also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

FIG. 8b shows a block diagram of a video decoder suitable for employing embodiments of the invention. FIG. 8b depicts a structure of a two-layer decoder, but it would be appreciated that the decoding operations may similarly be employed in a single-layer decoder.

The video decoder 550 comprises a first decoder section 552 for base layer pictures and a second decoder section 554 for enhancement layer pictures. Block 556 illustrates a demultiplexer for delivering information regarding base layer pictures to the first decoder section 552 and for delivering information regarding enhancement layer pictures to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform (T-1). Blocks 702, 802 illustrate inverse quantization (Q-1). Blocks 700, 800 illustrate entropy decoding (E-1). Blocks 706, 806 illustrate a reference frame memory (RFM). Blocks 707, 807 illustrate prediction (P) (either inter prediction or intra prediction). Blocks 708, 808 illustrate filtering (F). Blocks 709, 809 may be used to combine decoded prediction error information with predicted base or enhancement layer pictures to obtain the preliminary reconstructed images (I'n). Preliminary reconstructed and filtered base layer pictures may be output 710 from the first decoder section 552 and preliminary reconstructed and filtered enhancement layer pictures may be output 810 from the second decoder section 554.

Herein, the decoder could be interpreted to cover any operational unit capable to carry out the decoding operations, such as a player, a receiver, a gateway, a demultiplexer and/or a decoder.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

Video coding standards may specify the bitstream syntax and semantics as well as the decoding process for error-free bitstreams, whereas the encoding process might not be specified, but encoders may just be required to generate conforming bitstreams. Bitstream and decoder conformance can be verified with the Hypothetical Reference Decoder (HRD). The standards may contain coding tools that help in coping with transmission errors and losses, but the use of the tools in encoding may be optional and decoding process for erroneous bitstreams might not have been specified.

A syntax element may be defined as an element of data represented in the bitstream. A syntax structure may be defined as zero or more syntax elements present together in the bitstream in a specified order.

An elementary unit for the input to an encoder and the output of a decoder, respectively, is typically a picture. A picture given as an input to an encoder may also be referred to as a source picture, and a picture decoded by a decoded may be referred to as a decoded picture or a reconstructed picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of HEVC or alike. A component may be defined as an array or single sample from one of the three sample arrays (luma and two chroma) or the array or a single sample of the array that compose a picture in monochrome format.

A picture may be defined to be either a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays.

Some chroma formats may be summarized as follows:
In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate color planes are in use, each of the two chroma arrays has the same height and width as the luma array.

Coding formats or standards may allow to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

Generally, the source video sequence(s) provided as input for encoding may either represent interlaced source content or progressive source content. Fields of opposite parity have been captured at different times for interlaced source content. Progressive source content contains captured frames. An encoder may encode fields of interlaced source content in two ways: a pair of interlaced fields may be coded into a coded frame or a field may be coded as a coded field. Likewise, an encoder may encode frames of progressive source content in two ways: a frame of progressive source content may be coded into a coded frame or a pair of coded fields. A field pair or a complementary field pair may be defined as two fields next to each other in decoding and/or output order, having opposite parity (i.e. one being a top field and another being a bottom field) and neither belonging to any other complementary field pair. Some video coding standards or schemes allow mixing of coded frames and coded fields in the same coded video sequence. Moreover, predicting a coded field from a field in a coded frame and/or predicting a coded frame for a complementary field pair (coded as fields) may be enabled in encoding and/or decoding.

Partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures may be divided into coding units (CU) covering the area of the picture. A CU consists of one or more prediction units (PU) defining the prediction process for the samples within the CU and one or more transform units (TU) defining the prediction error coding process for the samples in the said CU. The CU may consist of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU may have at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It may be signalled at CU level whether prediction error coding is applied or not for each CU. In the case there is no prediction error residual associated with the CU, it can be considered there are no TUs for the said CU. The division of the image into CUs, and division of CUs into PUs and TUs may be signalled in the bitstream allowing the decoder to reproduce the intended structure of these units.

In a draft version of H.266/VVC, the following partitioning applies. It is noted that what is described here might still evolve in later draft versions of H.266/VVC until the standard is finalized. Pictures are partitioned into CTUs similarly to HEVC, although the maximum CTU size has been increased to 128×128. A coding tree unit (CTU) is first partitioned by a quaternary tree (a.k.a. quadtree) structure. Then the quaternary tree leaf nodes can be further partitioned by a multi-type tree structure. There are four splitting types in multi-type tree structure, vertical binary splitting, horizontal binary splitting, vertical ternary splitting, and horizontal ternary splitting. The multi-type tree leaf nodes are called coding units (CUs). CU, PU and TU have the same block size, unless the CU is too large for the maximum transform length. A segmentation structure for a CTU is a quadtree with nested multi-type tree using binary and ternary splits, i.e. no separate CU, PU and TU concepts are in use except when needed for CUs that have a size too large for the maximum transform length. A CU can have either a square or rectangular shape.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF).

The deblocking loop filter may include multiple filtering modes or strengths, which may be adaptively selected based on the features of the blocks adjacent to the boundary, such as the quantization parameter value, and/or signaling included by the encoder in the bitstream. For example, the deblocking loop filter may comprise a normal filtering mode and a strong filtering mode, which may differ in terms of the number of filter taps (i.e. number of samples being filtered on both sides of the boundary) and/or the filter tap values. For example, filtering of two samples along both sides of the boundary may be performed with a filter having the impulse response of (3 7 9-3)/16, when omitting the potential impact of a clipping operation.

The motion information may be indicated with motion vectors associated with each motion compensated image block in video codecs. Each of these motion vectors represents the displacement of the image block in the picture to be coded (in the encoder side) or decoded (in the decoder side) and the prediction source block in one of the previously coded or decoded pictures. In order to represent motion vectors efficiently those may be coded differentially with respect to block specific predicted motion vectors. The predicted motion vectors may be created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index may be predicted from adjacent blocks and/or co-located blocks in temporal reference picture. Moreover, high efficiency video codecs may employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

Video codecs may support motion compensated prediction from one source image (uni-prediction) and two sources (bi-prediction). In the case of uni-prediction a single motion vector is applied whereas in the case of bi-prediction two motion vectors are signaled and the motion compensated predictions from two sources are averaged to create the final sample prediction. In the case of weighted prediction, the relative weights of the two predictions can be adjusted, or a signaled offset can be added to the prediction signal.

In addition to applying motion compensation for inter picture prediction, similar approach can be applied to intra picture prediction. In this case the displacement vector indicates where from the same picture a block of samples can be copied to form a prediction of the block to be coded or decoded. This kind of intra block copying methods can improve the coding efficiency substantially in presence of repeating structures within the frame—such as text or other graphics.

The prediction residual after motion compensation or intra prediction may be first transformed with a transform kernel (like DCT) and then coded. The reason for this is that often there still exists some correlation among the residual and transform can in many cases help reduce this correlation and provide more efficient coding.

Video encoders may utilize Lagrangian cost functions to find optimal coding modes, e.g. the desired Macroblock mode and associated motion vectors. This kind of cost function uses a weighting factor λ to tie together the (exact or estimated) image distortion due to lossy coding methods and the (exact or estimated) amount of information that is required to represent the pixel values in an image area:

$$C=D+\lambda R \qquad \text{(Eq. 1)}$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Some codecs use a concept of picture order count (POC). A value of POC is derived for each picture and is non-decreasing with increasing picture position in output order. POC therefore indicates the output order of pictures. POC may be used in the decoding process for example for implicit scaling of motion vectors and for reference picture list initialization. Furthermore, POC may be used in the verification of output order conformance.

In video coding standards, a compliant bit stream must be able to be decoded by a hypothetical reference decoder that may be conceptually connected to the output of an encoder and consists of at least a pre-decoder buffer, a decoder and an output/display unit. This virtual decoder may be known as the hypothetical reference decoder (HRD) or the video buffering verifier (VBV). Video coding standards use variable-bitrate coding, which is caused for example by the flexibility of the encoder to select adaptively between intra and inter coding techniques for compressing video frames. To handle fluctuation in the bitrate variation of the compressed video, buffering may be used at the encoder and decoder side. HRD may be regarded as a hypothetical decoder model that specifies constraints on the variability within conforming bitstreams, conforming NAL unit streams or conforming byte streams that an encoding process may produce. A stream is compliant if it can be decoded by the HRD without buffer overflow or, in some cases, underflow. Buffer overflow happens if more bits are to be placed into the buffer when it is full. Buffer underflow happens if some bits are not in the buffer when said bits are to be fetched from the buffer for decoding/playback. One of the motivations for the HRD is to avoid so-called evil bitstreams, which would consume such a large quantity of resources that practical decoder implementations would not be able to handle.

A bitstream may be considered compliant if it can be decoded by the HRD without buffer overflow or, in some cases, underflow. Buffer overflow happens if more bits are to be placed into the buffer when it is full. Buffer underflow happens if some bits are not in the buffer when said bits are to be fetched from the buffer for decoding/playback.

An HRD may be a part of an encoder or operationally connected to the output of the encoder. The buffering occupancy and possibly other information of the HRD may be used to control the encoding process. For example, if a coded data buffer in the HRD is about to overflow, the encoding bitrate may be reduced for example by increasing a quantizer step size.

The operation of the HRD may be controlled by HRD parameters, such as buffer size(s) and initial delay(s). HRD parameters may be categorized into CPB parameters, such as CPB buffer size(s) and CPB initial delay(s), and DPB parameters, such as DPB buffer size(s) and DPB initial delay(s). The HRD parameter values may be created as part of the HRD process included or operationally connected to encoding. Alternatively, HRD parameters may be generated separately from encoding, for example in an HRD verifier that processes the input bitstream with the specified HRD process and generates such HRD parameter values according to which the bitstream in conforming. Another use for an HRD verifier is to verify that a given bitstream and given HRD parameters actually result into a conforming HRD operation and output.

HRD models typically include instantaneous decoding, while the input bitrate to the coded picture buffer (CPB) of HRD may be regarded as a constraint for the encoder and the bitstream on decoding rate of coded data and a requirement for decoders for the processing rate.

In the encoder-side a CPB as specified in the HRD may be used for verifying and controlling that buffering constraints are obeyed in the encoding. A decoder implementation may also have a CPB that may but does not necessarily operate similarly or identically to the CPB specified for HRD.

The CPB may operate on decoding unit basis. A decoding unit may be an access unit (AU) or it may be a subset of an access unit, such as an integer number of NAL units. The selection of the decoding unit may be indicated by an encoder in the bitstream.

A Decoded Picture Buffer (DPB) may be used in the encoder and/or in the decoder. There may be two reasons to buffer decoded pictures, for references in inter prediction and for reordering decoded pictures into output order. Some coding formats, such as HEVC, provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output. An HRD may also include a DPB. DPBs of an HRD and a decoder implementation may but do not need to operate identically.

Output order may be defined as the order in which the decoded pictures are output from the decoded picture buffer (for the decoded pictures that are to be output from the decoded picture buffer).

A decoder and/or an HRD may comprise a picture output process. The output process may be considered to be a process in which the decoder provides decoded and cropped pictures as the output of the decoding process. The output process is typically a part of video coding standards, typically as a part of the hypothetical reference decoder specification. In output cropping, lines and/or columns of samples may be removed from decoded pictures according to a cropping rectangle to form output pictures. A cropped decoded picture may be defined as the result of cropping a decoded picture based on the conformance cropping window specified e.g. in the sequence parameter set that is referred to by the corresponding coded picture.

In some video coding specifications, encoders may control whether a decoded (and cropped) picture is output by the picture output process or a similar decoder-side process. Encoders may include in or along a bitstream one or more syntax elements for controlling picture output. For example, bitstream syntax may include pic_output_flag e.g. in a picture header and/or an image segment header (e.g. a slice header). The semantics of pic_output_flag may be specified in a manner that when pic_output_flag is equal to 0, the respective decoded picture is not output (by the picture output process or alike), and when pic_output_flag is equal to 1, the respective decoded picture is output unless otherwise concluded in the decoding process.

Decoders may control whether a decoded (and cropped) picture is output by the picture output process or a similar decoder-side process. Decoders may decode from or along a bitstream one or more syntax elements for controlling picture output. For example, decoders may decode the pic_output_flag syntax element e.g. from a picture header and/or an image segment header (e.g. a slice header) of the bitstream. Decoders may derive a variable PicOutputFlag for each picture. Derivation of the value of PictureOutputFlag may involve but might not be limited to the following: If the current picture is a RASL picture (or alike) that is associated with the IRAP picture from which the decoding process started or that started a coded video sequence, PicOutputFlag may be set equal to 0. Otherwise, PicOutputFlag is set equal to pic_output_flag. If PicOutputFlag is equal to 0 for a decoded picture, the picture is not output by the picture output process or alike; otherwise the picture is output by the picture output process or alike.

The HRD may operate for example as follows. Data associated with decoding units that flow into the CPB according to a specified arrival schedule may be delivered by the Hypothetical Stream Scheduler (HSS). The arrival schedule may be determined by the encoder and indicated for example through picture timing SEI messages, and/or the arrival schedule may be derived for example based on a bitrate which may be indicated for example as part of HRD parameters in video usability information. The HRD parameters in video usability information may contain many sets of parameters, each for different bitrate or delivery schedule. The data associated with each decoding unit may be removed and decoded instantaneously by the instantaneous decoding process at CPB removal times. A CPB removal time may be determined for example using an initial CPB buffering delay, which may be determined by the encoder and indicated for example through a buffering period SEI message, and differential removal delays indicated for each picture for example though picture timing SEI messages. The initial arrival time (i.e. the arrival time of the first bit) of the very first decoding unit may be determined to be 0. The initial arrival time of any subsequent decoding unit may be determined to be equal to the final arrival time of the previous decoding unit. Each decoded picture is placed in the DPB. A decoded picture may be removed from the DPB at the later of the DPB output time or the time that it becomes no longer needed for inter-prediction reference. Thus, the operation of the CPB of the HRD may comprise timing of decoding unit initial arrival (when the first bit of the decoding unit enters the CPB), timing of decoding unit removal and decoding of decoding unit, whereas the operation of the DPB of the HRD may comprise removal of pictures from the DPB, picture output, and decoded picture marking and storage.

The operation of an AU-based coded picture buffering in the HRD can be described in a simplified manner as follows. It is assumed that bits arrive into the CPB at a constant arrival bitrate (when the so-called low-delay mode is not in use). Hence, coded pictures or access units are associated with initial arrival time, which indicates when the first bit of the coded picture or access unit enters the CPB. Furthermore, in the low-delay mode the coded pictures or access units are assumed to be removed instantaneously when the last bit of the coded picture or access unit is inserted into CPB and the respective decoded picture is inserted then to the DPB, thus simulating instantaneous decoding. This time is referred to as the removal time of the coded picture or access unit. The removal time of the first coded picture of the coded video sequence is typically controlled, for example by the Buffering Period Supplemental Enhancement Information (SEI) message. This so-called initial coded picture removal delay ensures that any variations of the coded bitrate, with respect to the constant bitrate used to fill in the CPB, do not cause starvation or overflow of the CPB. It is to be understood that the operation of the CPB is somewhat more sophisticated than what described here, having for example the low-delay operation mode and the capability to operate at many different constant bitrates. Moreover, the operation of the CPB may be specified differently in different standards.

Video coding standards may specify profiles and levels. A profile may be regarded as a subset of algorithmic features of the standard. Alternatively, a profile may be defined as a specified subset of the syntax of a coding standard. A level may be defined as a set of limits to the coding parameters that impose a set of constraints in decoder resource consumption. Alternatively, a level may be defined as a defined set of constraints on the values that may be taken by the syntax elements and variables of a coding standard. The same set of levels may be defined for all profiles, with most aspects of the definition of each level being in common across different profiles, although aspects may also differ between profiles. The profile and level can be used to signal properties of a media stream, as well as to signal the capability of a media decoder. Each pair of profile and level may be considered to form an "interoperability point."

Through the combination of a profile and a level, a decoder can declare, without actually attempting the decoding process, whether it is capable of decoding a stream. If the decoder is not capable of decoding the stream, it may cause the decoder to crash, operate slower than real-time, and/or discard data due to buffer overflows.

A concept of tier has been specified and used in HEVC and may be similarly specified and used in other codecs. A tier may be defined as a specified category of level constraints imposed on values of the syntax elements in the bitstream, where the level constraints are nested within a tier and a decoder conforming to a certain tier and level would be capable of decoding all bitstreams that conform to the same tier or the lower tier of that level or any level below it.

One or more syntax structures for (decoded) reference picture marking may exist in a video coding system. An encoder generates an instance of a syntax structure e.g. in each coded picture, and a decoder decodes an instance of the syntax structure e.g. from each coded picture. For example, the decoding of the syntax structure may cause pictures to be adaptively marked as "used for reference" or "unused for reference".

A reference picture set (RPS) syntax structure of HEVC is an example of a syntax structure for reference picture marking. A reference picture set valid or active for a picture includes all the reference pictures that may be used as reference for the picture and all the reference pictures that are kept marked as "used for reference" for any subsequent pictures in decoding order. The reference pictures that are kept marked as "used for reference" for any subsequent pictures in decoding order but that are not used as reference picture for the current picture or image segment may be considered inactive. For example, they might not be included in the initial reference picture list(s).

In some coding formats and codecs, a distinction is made between so-called short-term and long-term reference pictures. This distinction may affect some decoding processes such as motion vector scaling. Syntax structure(s) for marking reference pictures may be indicative of marking a picture as "used for long-term reference" or "used for short-term reference".

A reference picture list may be defined as list of reference pictures that is used for inter prediction of a P or B slice. In some coding formats, reference picture for inter prediction may be indicated with an index to a reference picture list. In some codecs, two reference picture lists (reference picture list 0 and reference picture list 1) are generated for each bi-predictive (B) slice, and one reference picture list (reference picture list 0) is formed for each inter-coded (P) slice.

A reference picture list, such as the reference picture list 0 and the reference picture list 1, may be constructed in two steps: First, an initial reference picture list is generated. The initial reference picture list may be generated using an algorithm pre-defined in a standard. Such an algorithm may use e.g. POC and/or temporal sub-layer, as the basis. The algorithm may process reference pictures with particular marking(s), such as "used for reference", and omit other reference pictures, i.e. avoid inserting other reference pictures into the initial reference picture list. An example of such other reference picture is a reference picture marked as "unused for reference" but still residing in the decoded picture buffer waiting to be output from the decoder. Second, the initial reference picture list may be reordered through a specific syntax structure, such as reference picture list reordering (RPLR) commands of H.264/AVC or reference picture list modification syntax structure of HEVC or anything alike. Furthermore, the number of active reference pictures may be indicated for each list, and the use of the pictures beyond the active ones in the list as reference for inter prediction is disabled. One or both the reference picture list initialization and reference picture list modification may process only active reference pictures among those reference pictures that are marked as "used for reference" or alike.

In VVC, reference picture lists are indicated directly in a reference picture list syntax structure rather than indicating reference picture sets and using an initialization and optional reordering process as described above. When a picture is present in any reference picture list of the current picture (within active or inactive entries of any reference picture list), it marked as "used for long-term reference" or "used for short-term reference". When a picture is present in no reference picture list of the current picture, it is marked as "unused for reference". The abbreviation RPL may be used to refer to the reference picture list syntax structure and/or to one or more reference picture lists.

Scalable video coding refers to coding structure where one bitstream can contain multiple representations of the content at different bitrates, resolutions or frame rates. In these cases, the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream may include a "base layer" providing the lowest quality video available and one or more enhancement layers that enhance the video quality when received and decoded together with the lower layers. In order to improve coding efficiency for the enhancement layers, the coded representation of that layer may depend on the lower layers. E.g. the motion and mode information of the enhancement layer can be predicted from lower layers. Similarly, the pixel data of the lower layers can be used to create prediction for the enhancement layer.

A scalable video codec for quality scalability (also known as Signal-to-Noise or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use e.g. with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer.

Spatial scalability: Base layer pictures are coded at a lower resolution (i.e. have fewer samples) than enhancement layer pictures. Spatial scalability and quality scalability may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

Region-of-interest (ROI) scalability: An enhancement layer represents of spatial subset of the base layer. ROI scalability may be used together with other types of scalability, e.g. quality or spatial scalability so that the enhancement layer provides higher subjective quality for the spatial subset.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

In all of the above scalability cases, base layer information could be used to code enhancement layer to minimize the additional bitrate overhead.

Scalability can be enabled in two basic ways. Either by introducing new coding modes for performing prediction of pixel values or syntax from lower layers of the scalable representation or by placing the lower layer pictures to the reference picture buffer (decoded picture buffer, DPB) of the higher layer. The first approach is more flexible and thus can provide better coding efficiency in most cases. However, the second, reference frame-based scalability, approach can be implemented very efficiently with minimal changes to single layer codecs while still achieving majority of the coding efficiency gains available. Essentially a reference frame-based scalability codec can be implemented by utilizing the same hardware or software implementation for all the layers, just taking care of the DPB management by external means.

A sender, a gateway, or alike may select the transmitted layers and/or sub-layers of a scalable video bitstream, or likewise a receiver, a client, a player, or alike may request transmission of selected layers and/or sub-layers of a scalable video bitstream. Terms layer extraction, extraction of layers, or layer down-switching may refer to transmitting fewer layers than what is available in the bitstream. Layer up-switching may refer to transmitting additional layer(s) compared to those transmitted prior to the layer up-switching, i.e. restarting the transmission of one or more layers whose transmission was ceased earlier in layer down-switching. Similarly to layer down-switching and/or up-switching, down- and/or up-switching of temporal sub-layers may be performed. Both layer and sub-layer down-switching and/or up-switching may be performed similarly. Layer and sub-layer down-switching and/or up-switching may be carried out in the same access unit or alike (i.e. virtually simultaneously) or may be carried out in different access units or alike (i.e. virtually at distinct times). Layer up-switching may take place at a random-access picture (e.g. IRAP picture in HEVC). Sub-layer up-switching may take place at a picture of a particular type (e.g. STSA or TSA picture in HEVC).

The following definitions may be made regarding the High Efficiency Video Coding standard but may also apply for other codecs. An independent layer is a layer that does not have direct reference layers, i.e. is not inter-layer predicted. A non-base layer is a layer in which all VCL NAL units have the same nuh_layer_id value greater than 0. An independent non-base layer is both an independent layer and a non-base layer.

In the following, an example of a sub-bitstream extraction process will be shortly explained. A bitstream outBitstream can be generated from an independent non-base layer of the bitstream inBitstream as follows. The bitstream outBitstream is set to be identical to the bitstream inBitstream. NAL units with nal_unit_type not equal to SPS_NUT, PPS_NUT, and EOB_NUT and with nuh_layer_id not equal to the assignedBaseLayerId are removed from outBitstream. NAL units with nal_unit_type equal to SPS_NUT or PPS_NUT with nuh_layer_id not equal to 0 or assignedBaseLayerId are removed from outBitstream. NAL units with nal_unit_type equal to VPS_NUT are removed from outBitstream. All NAL units with TemporalId greater than tIdTarget are removed from outBitstream. nuh_layer_id is set equal to 0 in each NAL unit of outBitstream. The bitstream outBitstream can be decoded with the HEVC decoding process.

In the following, an example of a video parameter set (VPS) of HEVC for indicating layer properties will be shortly explained. The video parameter set contains an extension part, a part of which is presented below:

| | Descriptor |
|---|---|
| vps_extension( ) { | |
|   if( vps_max_layers_minus1 > 0 && | |
|   vps_base_layer_internal_flag ) | |
|     profile_tier_level( 0, vps_max_sub_layers_minus1 ) | |
|   splitting_flag | u(1) |
|   for( i = 0, NumScalabilityTypes = 0; i < 16; i++ ) { | |
|     scalability_mask_flag[ i ] | u(1) |
|     NumScalabilityTypes += scalability_mask_flag[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 1; i <= MaxLayersMinus1; i++ ) { | |
|     if( vps_nuh_layer_id_present_flag ) | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
| } | |
| . . . | |

The video parameter set of HEVC specifies a scalability mask, which indicates the type(s) of scalability that are in use for a layer:

scalability_mask_flag[i] equal to 1 indicates that dimension_id syntax elements corresponding to the i-th scalability dimension in Table F.1 are present. scalability_mask_flag[i] equal to 0 indicates that dimension_id syntax elements corresponding to the i-th scalability dimension are not present.

TABLE F.1

Mapping of ScalabiltyId to scalability dimensions

| Scalability mask index | Scalability dimension | ScalabilityId mapping |
|---|---|---|
| 0 | Texture or depth | DepthLayerFlag |
| 1 | Multiview | ViewOrderIdx |
| 2 | Spatial/quality scalability | DependencyId |
| 3 | Auxiliary | AuxId |
| 4-15 | Reserved | | layer_id_in_nuh[i] specifies the value of the nuh_layer_id syntax element in VCL NAL units of the i-th layer. When i is greater than 0, layer_id_in_nuh[i] shall be greater than layer_id_in_nuh[i−1]. For any value of i in the range of 0 to MaxLayersMinus1, inclusive, when not present, the value of layer_id_in_nuh[i] is inferred to be equal to i.

For i from 0 to MaxLayersMinus1, inclusive, the variable LayerIdxInVps[layer_id_in_nuh[i]] is set equal to i.

dimension_id[i][j] specifies the identifier of the j-th present scalability dimension type of the i-th layer. The number of bits used for the representation of dimension_id[i][j] is dimension_id_len_minus1[j]+1 bits.

Depending on splitting_flag, the following applies. If splitting_flag is equal to 1, for i from 0 to MaxLayersMinus1, inclusive, and j from 0 to NumScalabilityTypes−1, inclusive, dimension_id[i][j] is inferred to be equal to ((layer_id_in_nuh[i]&((1<<dimBitOffset[j+1])−1))>>dimBitOffset[j]). If splitting_flag is not equal to 1, (splitting_flag is equal to 0), for j from 0 to NumScalabilityTypes−1, inclusive, dimension_id[0][j] is inferred to be equal to 0.

The variable ScalabilityId[i][smIdx] specifying the identifier of the smIdx-th scalability dimension type of the i-th layer, and the variables DepthLayerFlag[lId], ViewOrderIdx [lId], DependencyId[lId], and AuxId[lId] specifying the depth flag, the view order index, the spatial/quality scalability identifier and the auxiliary identifier, respectively, of the layer with nuh_layer_id equal to lId may be derived as follows:

```
NumViews = 1
for( i = 0; i <= MaxLayersMinus1; i++ ) {
  lId = layer_id_in_nuh[ i ]
  for( smIdx= 0, j = 0; smIdx < 16; smIdx++ ) {
    if( scalability_mask_flag[ smIdx ] )
      ScalabilityId[ i ][ smIdx ] = dimension_id[ i ][ j++ ]
    else
      ScalabilityId[ i ][ smIdx ] = 0
  }
  DepthLayerFlag[ lId ] = ScalabilityId[ i ][ 0 ]
  ViewOrderIdx[ lId ] = ScalabilityId[ i ][ 1 ]
  DependencyId[ lId ] = ScalabilityId[ i ][ 2 ]
    (F-3)
  AuxId[ lId ] = ScalabilityId[ i ][ 3 ]
  if( i > 0 ) {
    newViewFlag = 1
    for( j = 0; j < i; j++ )
      if( ViewOrderIdx[ lId ] == ViewOrderIdx[ layer_id_in_nuh[ j ] ] )
        newViewFlag = 0
    NumViews += newViewFlag
  }
}
```

An output layer set (OLS) may be defined as a set of layers where one or more layers in the set of layers are indicated to be output layers. Pictures of an output layer may be determined to be output by the decoder similarly to determining whether a picture is output or not in single-layer bitstreams, as described earlier. Pictures that are among the layers of an OLS but not among output layers are not output by the decoder. If multiple OLSs are indicated for a bitstream, the decoder may be instructed e.g. thorough an interface which OLS is used in decoding and output. OLSs may be indicated e.g. in a VPS.

An elementary unit for the output of encoders of some coding formats, such as HEVC, and the input of decoders of some coding formats, such as HEVC, is a Network Abstraction Layer (NAL) unit. For transport over packet-oriented networks or storage into structured files, NAL units may be encapsulated into packets or similar structures.

A bytestream format may be specified for NAL unit streams for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not.

A NAL unit may be defined as a syntax structure containing an indication of the type of data to follow and bytes containing that data in the form of a raw byte sequence payload (RBSP) interspersed as necessary with emulation prevention bytes. A RBSP may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In HEVC, a two-byte NAL unit header is used for all specified NAL unit types, while in other codecs NAL unit header may be similar to that in HEVC.

In HEVC, the NAL unit header contains one reserved bit, a six-bit NAL unit type indication, a three-bit temporal_id_plus1 indication for temporal level or sub-layer (may be required to be greater than or equal to 1) and a six-bit nuh_layer_id syntax element.

In VVC Draft 5, the NAL unit header contains a five-bit NAL unit type indication separated into two syntax elements that are non-adjacent within the NAL unit header, a three-bit temporal_id_plus1 indication for temporal level or sub-layer (may be required to be greater than or equal to 1), a seven-bit nuh_layer_id syntax element, and one reserved bit.

In HEVC and VVC Draft 5, the temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream. Such temporal scalable layer may comprise VCL NAL units with a particular value of the TemporalId variable and the associated non-VCL NAL units.

In HEVC and VVC Draft 5, nuh_layer_id can be understood as a scalability layer identifier. In VVC Draft 5, inter-layer prediction is not enabled, i.e. all layers are independent layers.

NAL units can be categorized into Video Coding Layer (VCL) NAL units and non-VCL NAL units. VCL NAL units are typically coded slice NAL units. In HEVC, VCL NAL units contain syntax elements representing one or more CU. In HEVC, the NAL unit type within a certain range indicates a VCL NAL unit, and the VCL NAL unit type indicates a picture type.

Images can be split into independently codable and decodable image segments (e.g. slices or tiles or tile groups). Such image segments may enable parallel processing, "Slices" in this description may refer to image segments constructed of certain number of basic coding units that are processed in default coding or decoding order, while "tiles" may refer to image segments that have been defined as rectangular image regions. A tile group may be defined as a group of one or more tiles. Image segments may be coded as separate units in the bitstream, such as VCL NAL units in H.264/AVC and HEVC and VVC. Coded image segments may comprise a header and a payload, wherein the header contains parameter values needed for decoding the payload. The payload of a slice may be referred to as slice data.

In the HEVC standard, a picture can be partitioned in tiles, which are rectangular and contain an integer number of CTUs. In the HEVC standard, the partitioning to tiles forms a grid that may be characterized by a list of tile column widths (in CTUs) and a list of tile row heights (in CTUs). Tiles are ordered in the bitstream consecutively in the raster scan order of the tile grid. A tile may contain an integer number of slices.

In the HEVC, a slice consists of an integer number of CTUs. The CTUs are scanned in the raster scan order of CTUs within tiles or within a picture, if tiles are not in use. A slice may contain an integer number of tiles or a slice can be contained in a tile. Within a CTU, the CUs have a specific scan order.

In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL (Network Abstraction Layer) unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

In VVC Draft 5, pictures are partitioned to tiles along a tile grid (similarly to HEVC). A tile is a sequence of coding tree units (CTUs) that covers one "cell" in the tile grid, i.e., a rectangular region of a picture. A tile is divided into one or more bricks, each of which consisting of a number of CTU rows within the tile. A tile that is not partitioned into multiple bricks is also referred to as a brick. However, a brick that is a true subset of a tile is not referred to as a tile. A slice either contains a number of tiles of a picture or a number of bricks of a tile. A slice is a VCL NAL unit. Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice. It is noted that what was described in this paragraph might still evolve in later draft versions of H.266/VVC until the standard is finalized.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that neither variables nor any decoding results that are derived from blocks outside the MCTS are used in any decoding processes within the MCTS. For example, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. An MCTS sequence may be defined as a sequence of respective MCTSs in one or more coded video sequences or alike. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures. A motion-constrained tile set may be regarded as an independently coded tile set, since it may be decoded without the other tile sets.

It is appreciated that sample locations used in inter prediction may be saturated so that a location that would be outside the picture otherwise is saturated to point to the corresponding boundary sample of the picture. Hence, in some use cases, if a tile boundary is also a picture boundary, motion vectors may effectively cross that boundary or a motion vector may effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets SEI (Supplemental Enhancement Information) message of HEVC can be used to indicate the presence of motion-constrained tile sets in the bitstream.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Some coding formats specify parameter sets that may carry parameter values needed for the decoding or reconstruction of decoded pictures. Parameters that remain unchanged through a coded video sequence may be included in a sequence parameter set (SPS). In addition to the parameters that may be needed by the decoding process, the sequence parameter set may optionally contain video usability information (VUI), which includes parameters that may be important for buffering, picture output timing, rendering, and resource reservation. A picture parameter set (PPS) contains such parameters that are likely to be unchanged in several coded pictures. A picture parameter set may include parameters that can be referred to by the coded image segments of one or more coded pictures. A header parameter set (HPS) has been proposed to contain such parameters that may change on picture basis.

A video parameter set (VPS) may be defined as a syntax structure containing syntax elements that apply to zero or more entire coded video sequences. VPS may provide information about the dependency relationships of the layers in a bitstream, as well as many other information that are applicable to all slices across all layers in the entire coded video sequence. In HEVC, VPS may be considered to comprise two parts, the base VPS and a VPS extension, where the VPS extension may be optionally present. A video parameter set RBSP may include parameters that can be referred to by one or more sequence parameter set RBSPs.

A parameter set may be activated when it is referenced e.g. through its identifier. For example, a header of an image segment, such as a slice header, may contain an identifier of the PPS that is activated for decoding the coded picture containing the image segment. A PPS may contain an identifier of the SPS that is activated, when the PPS is activated. An activation of a parameter set of a particular type may cause the deactivation of the previously active parameter set of the same type.

The relationship and hierarchy between VPS, SPS, and PPS may be described as follows. VPS resides one level above SPS in the parameter set hierarchy VPS may include parameters that are common for all image segments across all layers in the entire coded video sequence. SPS includes the parameters that are common for all image segments in a particular layer in the entire coded video sequence and may be shared by multiple layers. PPS includes the parameters that are common for all image segments in a coded picture and are likely to be shared by all image segments in multiple coded pictures.

Instead of or in addition to parameter sets at different hierarchy levels (e.g. sequence and picture), video coding formats may include header syntax structures, such as a sequence header or a picture header. A sequence header may precede any other data of the coded video sequence in the bitstream order. A picture header may precede any coded video data for the picture in the bitstream order.

The phrase along the bitstream (e.g. indicating along the bitstream) or along a coded unit of a bitstream (e.g. indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

A coded picture is a coded representation of a picture.

A Random Access Point (RAP) picture, which may also be referred to as an intra random access point (IRAP) picture, may comprise only intra-coded image segments. Furthermore, a RAP picture may constrain subsequent pictures in output order to be such that they can be correctly decoded without performing the decoding process of any pictures that precede the RAP picture in decoding order. There may be pictures in a bitstream that contain only intra-coded slices that are not IRAP pictures.

In some contexts, the term random-access picture may be used interchangeably with the term RAP picture or the term IRAP picture. In some contexts, a RAP picture or an IRAP picture may be defined as one category of random-access pictures, characterized in that they contain only intra-coded image segments, whereas other category or categories of random-access pictures may allow in-picture prediction, such as intra block copy.

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture. Some picture types are more fine-grained as indicated in the table above. For example, three types of BLA pictures are specified, BLA without leading pictures, BLA with decodable leading pictures (i.e. without RASL pictures), and BLA with any leading pictures.

In HEVC, an IRAP picture may be a BLA picture, a CRA picture or an IDR picture. In VVC Draft 5, an IRAP picture may be a CRA picture or an IDR picture.

VVC Draft 5 includes the following non-IRAP picture types that are specified similarly to the respective picture types in HEVC: TRAIL, STSA, RADL, and RASL. In addition, a gradual random access (GRA) picture is a trailing picture, from which decoding can be started and that guarantees decoded pictures to be correct in content at and after an indicated position (a.k.a. recovery point).

In HEVC and VVC Draft 5, provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order.

In HEVC and VVC Draft 5, a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order and follows the associated RAP picture in decoding order. The associated RAP picture is the previous RAP picture in decoding order (if present). In some coding specifications, such as HEVC and VVC Draft 5, a leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture.

When a part of a bitstream starting from a CRA picture is included in another bitstream, the RASL pictures associated with the CRA picture might not be correctly decodable, because some of their reference pictures might not be present in the combined bitstream. To make such a splicing operation straightforward in HEVC bitstreams, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding. Another way for such a splicing operation that is applicable for HEVC bitstreams and VVC Draft 5 bitstreams is to include an end of sequence (EOS) NAL unit just before the CRA access unit. This causes the CRA picture to be processed like it were the first picture of the bitstream and the RASL pictures associated with the CRA picture are consequently not output by the decoder.

In HEVC, a BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set.

Two IDR picture types may be defined and indicated: IDR pictures without leading pictures and IDR pictures that may have associated decodable leading pictures (i.e. RADL pictures).

A trailing picture may be defined as a picture that follows the associated RAP picture in output order (and also in decoding order). Additionally, a trailing picture may be required not to be classified as any other picture type, such as TSA or STSA picture.

In HEVC there are two picture types, the TSA and STSA picture types that can be used to indicate temporal sub-layer switching points. VVC Draft 5 specifies the STSA picture type similarly to the STSA picture type in HEVC. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides. In nested temporal scalability, all (trailing) pictures with TemporalId greater than 0 could be labeled as TSA pictures.

An access unit may comprise coded video data for a single time instance and associated other data. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit. An access unit delimiter NAL unit may indicate the start of an access unit.

It may be required that coded pictures appear in certain order within an access unit. For example, a coded picture with nuh_layer_id equal to nuhLayerIdA may be required to precede, in decoding order, all coded pictures with nuh_layer_id greater than nuhLayerIdA in the same access unit.

A bitstream may be defined as a sequence of bits, which may in some coding formats or standards be in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of bitstream (EOB) NAL unit and which is the last NAL unit of the bitstream.

A coded video sequence (CVS) may be defined as such a sequence of coded pictures in decoding order that is independently decodable and is followed by another coded video sequence or the end of the bitstream. A coded video sequence may additionally or alternatively be specified to end, when a specific NAL unit, which may be referred to as an end of sequence (EOS) NAL unit, appears in the bitstream. In HEVC, an EOS NAL unit with nuh_layer_id equal to 0 ends a coded video sequence.

Bitstreams or coded video sequences can be encoded to be temporally scalable as follows. Each picture may be assigned to a particular temporal sub-layer. Temporal sub-layers may be enumerated e.g. from 0 upwards. The lowest temporal sub-layer, sub-layer 0, may be decoded independently. Pictures at temporal sub-layer 1 may be predicted from reconstructed pictures at temporal sub-layers 0 and 1. Pictures at temporal sub-layer 2 may be predicted from reconstructed pictures at temporal sub-layers 0, 1, and 2, and so on. In other words, a picture at temporal sub-layer N does not use any picture at temporal sub-layer greater than N as a reference for inter prediction. The bitstream created by excluding all pictures greater than or equal to a selected sub-layer value and including pictures remains conforming.

A sub-layer access picture may be defined as a picture from which the decoding of a sub-layer can be started correctly, i.e. starting from which all pictures of the sub-layer can be correctly decoded. In HEVC there are two picture types, the temporal sub-layer access (TSA) and step-wise temporal sub-layer access (STSA) picture types, that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A video shot may be defined as a temporally contiguous set of pictures that are taken with one camera or are otherwise correlated (e.g. a computer-generated animated scene). Metadata on shots may accompany the captured content, or shots may be detected from a video sequence comprising several shots in time-interleaved manner. Shot detection methods operating on uncompressed video content may include e.g. pair-wise pixel comparison, block-based comparison, histogram comparison, and segmentation followed by segment-based comparison.

When describing H.264/AVC, HEVC, VCC, and example embodiments, the following description may be used to specify the parsing process of each syntax element.
- u(n): unsigned integer using n bits. When n is "v" in the syntax table, the number of bits varies in a manner dependent on the value of other syntax elements. The paring process for this descriptor is specified by n next bits from the bitstream interpreted as a binary representation of an unsigned integer with the most significant bit written first.
- ue(v): unsigned integer Exponential-Golomb-coded (a.k.a. exp-Golomb coded) syntax element with the left bit first.

An Exponential-Golomb bit string may be converted to a code number (codeNum) for example using the following table:

| Bit string | codeNum |
| --- | --- |
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| ... | ... |

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). The ISO file format is the base for derivation of all the above mentioned file formats (excluding the ISO file format itself). These file formats (including the ISO file format itself) are generally called the ISO family of file formats.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks. Tracks comprise samples, such as audio or video frames. For video tracks, a media sample may correspond to a coded picture or an access unit. A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

The 'trak' box includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derived from generic classes (e.g. VisualSampleEntry, AudioSampleEntry). Which type of sample entry form is used for derivation of the track-type specific sample entry format is determined by the media handler of the track.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs (a.k.a. track fragment runs), each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es).

TrackGroupBox, which is contained in TrackBox, enables indication of groups of tracks where each group shares a particular characteristic or the tracks within a group have a particular relationship. The box contains zero or more boxes, and the particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group.

The ISOBMFF Format contains three mechanisms for timed metadata that can be associated with particular samples: sample groups, timed metadata tracks, and sample auxiliary information. A derived specification may provide similar functionality with one or more of these three mechanisms.

A sample grouping in the ISO base media file format and its derivatives, such as ISO/IEC 14496-15 (Carriage of network abstraction layer (NAL) unit structured video in the ISO base media file format), may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Recently, Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP is easy to configure and is typically granted traversal of firewalls and network address translators (NAT), which makes it attractive for multimedia streaming applications.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, 2nd Edition, 2014). 3GPP continued to work on adaptive HTTP streaming in communication with MPEG and published 3GP-DASH (Dynamic Adaptive Streaming over HTTP; 3GPP TS 26.247: "Transparent end-to-end packet-switched streaming Service (PSS); Progressive download and dynamic adaptive Streaming over HTTP (3GP-DASH)". MPEG DASH and 3GP-DASH are technically close to each other and may therefore be collectively referred to as DASH. Some concepts, formats, and operations of DASH are described below as an example of a video streaming system, wherein the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single file or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In DASH, hierarchical data model is used to structure media presentation as follows. A media presentation consists of a sequence of one or more Periods, each Period contains one or more Groups, each Group contains one or more Adaptation Sets, each Adaptation Set contains one or more Representations, each Representation consists of one or more Segments. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attributes as defined in XML.

In DASH, all descriptor elements are structured in the same way, namely they contain a @schemeIdUri attribute that provides a URI to identify the scheme and an optional attribute @value and an optional attribute @id. The semantics of the element are specific to the scheme employed. The URI identifying the scheme may be a URN or a URL.

In DASH, an independent representation may be defined as a representation that can be processed independently of any other representations. An independent representation may be understood to comprise an independent bitstream or an independent layer of a bitstream. A dependent representation may be defined as a representation for which Segments from its complementary representations are necessary for presentation and/or decoding of the contained media content components. A dependent representation may be understood to comprise e.g. a predicted layer of a scalable bitstream. A complementary representation may be defined as a representation which complements at least one dependent representation. A complementary representation may be an independent representation or a dependent representation. Dependent Representations may be described by a Representation element that contains a @dependencyId attribute. Dependent Representations can be regarded as regular Representations except that they depend on a set of complementary Representations for decoding and/or presentation. The @dependencyId contains the values of the @id attribute of all the complementary Representations, i.e. Representations that are necessary to present and/or decode the media content components contained in this dependent Representation.

Track references of ISOBMFF can be reflected in the list of four-character codes in the @associationType attribute of DASH MPD that is mapped to the list of Representation@id values given in the @associationId in a one to one manner. These attributes may be used for linking media Representations with metadata Representations.

A DASH service may be provided as on-demand service or live service. In the former, the MPD is a static and all Segments of a Media Presentation are already available when a content provider publishes an MPD. In the latter, however, the MPD may be static or dynamic depending on the Segment URLs construction method employed by a MPD and Segments are created continuously as the content is produced and published to DASH clients by a content provider. Segment URLs construction method may be either template-based Segment URLs construction method or the Segment list generation method. In the former, a DASH client is able to construct Segment URLs without updating an MPD before requesting a Segment. In the latter, a DASH client has to periodically download the updated MPDs to get Segment URLs. For live service, hence, the template-based Segment URLs construction method is superior to the Segment list generation method.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units. Subsegments may be indexed by Segment Index box (a.k.a. SegmentIndexBox), which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

SegmentIndexBox may have the following syntax:

```
aligned(8) class SegmentIndexBox extends FullBox('sidx', version, 0) {
    unsigned int(32) reference_ID;
    unsigned int(32) timescale;
    if (version==0) {
        unsigned int(32) earliest_presentation_time;
        unsigned int(32) first_offset;
    }
    else {
        unsigned int(64) earliest_presentation_time;
        unsigned int(64) first_offset;
    }
    unsigned int(16) reserved = 0;
    unsigned int(16) reference_count;
    for(i=1; i <= reference_count; i++)
    {
        bit (1)                    reference_type;
        unsigned int(31)           referenced_size;
        unsigned int(32)           subsegment_duration;
        bit(1)                     starts_with_SAP;
        unsigned int(3)            SAP_type;
        unsigned int(28)           SAP_delta_time;
    }
}
```

The semantics of some syntax elements of SegmentIndexBox may be specified as follows.

reference_type: when set to 1 indicates that the reference is to a SegmentIndexBox; otherwise the reference is to media content (e.g., in the case of files based on this document, to a MovieFragmentBox); if a separate index segment is used, then entries with reference type 1 are in the index segment, and entries with reference type 0 are in the media file.

referenced_size: the distance in bytes from the first byte of the referenced item to the first byte of the next referenced item, or in the case of the last entry, the end of the referenced material.

The term Segment Index may be defined as a compact index of the time range to byte range mapping within a Media Segment separately from the MPD. A Segment Index may comprise one or more SegmentIndexBoxes.

The notation (Sub)segment refers to either a Segment or a Subsegment. If Segment Index boxes are not present, the notation (Sub)segment refers to a Segment. If Segment Index boxes are present, the notation (Sub)segment may refer to a Segment or a Subsegment, e.g. depending on whether the client issues requests on Segment or Subsegment basis.

MPEG-DASH defines segment-container formats for both ISO Base Media File Format and MPEG-2 Transport Streams. Other specifications may specify segment formats based on other container formats. For example, a segment format based on Matroska container file format has been proposed.

Sub-Representations are embedded in regular Representations and are described by the SubRepresentation element. SubRepresentation elements are contained in a Representation element. The SubRepresentation element describes properties of one or several media content components that are embedded in the Representation. It may for example describe the exact properties of an embedded audio component (such as codec, sampling rate, etc., for example), an embedded sub-title (such as codec, for example) or it may describe some embedded lower quality video layer (such as some lower frame rate, or otherwise, for example). Sub-Representations and Representation share some common attributes and elements.

In case the @level attribute is present in the SubRepresentation element, the following applies:

Sub-Representations provide the ability for accessing a lower quality version of the Representation in which they are contained. In this case, Sub-Representations for example allow extracting the audio track in a multiplexed Representation or may allow for efficient fast-forward or rewind operations if provided with lower frame rate;

The Initialization Segment and/or the Media Segments and/or the Index Segments shall provide sufficient information such that the data can be easily accessed through HTTP partial GET requests. The details on providing such information are defined by the media format in use.

When ISOBMFF Segments are used for a Representation comprising Sub-Representations, the following applies:

The Initialization Segment contains the Level Assignment box.

The Subsegment Index box ('ssix') is present for each Subsegment.

The attribute @level specifies the level to which the described Sub-Representation is associated to in the Subsegment Index. The information in Representation, Sub-Representation and in the Level Assignment ('leva') box contains information on the assignment of media data to levels.

Media data should have an order such that each level provides an enhancement compared to the lower levels.

If the @level attribute is absent, then the SubRepresentation element is solely used to provide a more detailed description for media streams that are embedded in the Representation.

The ISOBMFF includes the so-called level mechanism to specify subsets of the file. Levels follow the dependency hierarchy so that samples mapped to level n may depend on any samples of levels m, where m<=n, and do not depend on any samples of levels p, where p>n. For example, levels can be specified according to temporal sub-layer (e.g., TemporalId of HEVC). Levels may be announced in the Level Assignment ('leva') box (a.k.a. LevelAssignmentBox) contained in the Movie Extends ('mvex') box. Levels cannot be specified for the initial movie. When the Level Assignment box is present, it applies to all movie fragments subsequent to the initial movie. For the context of the Level Assignment box, a fraction is defined to consist of one or more Movie Fragment boxes and the associated Media Data boxes, possibly including only an initial part of the last Media Data Box. Within a fraction, data for each level appears contiguously. Data for levels within a fraction appears in increasing order of level value. All data in a fraction is assigned to levels. The Level Assignment box provides a mapping from features, such as scalability layers or temporal sub-layers, to levels. A feature can be specified through a track, a sub-track within a track, or a sample grouping of a track. For example, the Temporal Level sample grouping may be used to indicate a mapping of the pictures to temporal levels, which are equivalent to temporal sub-layers in HEVC. That is, HEVC pictures of a certain TemporalId value may be mapped to a particular temporal level using the Temporal Level sample grouping (and the same can be repeated for all TemporalId values). The Level Assignment box can then refer to the Temporal Level sample grouping in the indicated mapping to levels.

The Subsegment Index box ('ssix', a.k.a. SubsegmentIndexBox) provides a mapping from levels (as specified by the Level Assignment box) to byte ranges of the indexed subsegment. In other words, this box provides a compact index for how the data in a subsegment is ordered according to levels into partial subsegments. It enables a client to easily access data for partial subsegments by downloading ranges of data in the subsegment. When the Subsegment Index box is present, each byte in the subsegment is assigned to a level. If the range is not associated with any information in the level assignment, then any level that is not included in the level assignment may be used. There is 0 or 1 Subsegment Index boxes present per each Segment Index box that indexes only leaf subsegments, i.e. that only indexes subsegments but no segment indexes. A Subsegment Index box, if any, is the next box after the associated Segment Index box. A Subsegment Index box documents the subsegment that is indicated in the immediately preceding Segment Index box. Each level may be assigned to exactly one partial subsegment, i.e. byte ranges for one level are contiguous. Levels of partial subsegments are assigned by increasing numbers within a subsegment, i.e., samples of a partial subsegment may depend on any samples of preceding partial subsegments in the same subsegment, but not the other way around. For example, each partial subsegment contains samples having an identical temporal sub-layer and partial subsegments appear in increasing temporal sub-layer order within the subsegment. When a partial subsegment is accessed in this way, the final Media Data box may be incomplete, that is, less data is accessed than the length indication of the Media Data Box indicates is present. The length of the Media Data box may need adjusting, or padding may be used. The padding_flag in the Level Assignment Box indicates whether this missing data can be replaced by zeros. If not, the sample data for samples assigned to levels that are not accessed is not present, and care should be taken.

DASH supports rate adaptation by dynamically requesting Media Segments from different Representations within an Adaptation Set to match varying network bandwidth. When a DASH client switches up/down Representation, coding dependencies within Representation have to be taken into account. A Representation switch may happen at a random access point (RAP), which is typically used in video coding techniques such as H.264/AVC. In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

In DASH the automated selection between Representations in the same Adaptation Set have been performed e.g. based on but not limited to one or more of the following: the width and height (@width and @height); the frame rate (@frameRate); the bitrate (@bandwidth); indicated quality ordering between the Representations (@qualityRanking). The semantics of @qualityRanking are specified as follows: specifies a quality ranking of the Representation relative to other Representations in the same Adaptation Set. Lower values represent higher quality content. If not present, then no ranking is defined.

Several types of SAP have been specified, including the following. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

In some video coding standards, such as MPEG-2, each intra picture has been a random access point in a coded sequence. The capability of flexible use of multiple reference pictures for inter prediction in some video coding standards, such as H.264/AVC and H.265/HEVC, has a consequence that an intra picture may not be sufficient for random access. Therefore, pictures may be marked with respect to their random access point functionality rather than inferring such functionality from the coding type; for example an IDR picture as specified in the H.264/AVC standard can be used as a random access point. A closed group of pictures (GOP) is such a group of pictures in which all pictures can be correctly decoded. For example, in H.264/AVC, a closed GOP may start from an IDR access unit.

An open group of pictures (GOP) is such a group of pictures in which pictures preceding the initial intra picture in output order may not be correctly decodable but pictures following the initial intra picture in output order are correctly decodable. Such an initial intra picture may be indicated in the bitstream and/or concluded from the indications from the bitstream, e.g. by using the CRA NAL unit type in HEVC. The pictures preceding the initial intra picture starting an open GOP in output order and following the initial intra picture in decoding order may be referred to as leading pictures. There are two types of leading pictures: decodable and non-decodable. Decodable leading pictures, such as RADL pictures of HEVC, are such that can be correctly decoded when the decoding is started from the initial intra picture starting the open GOP. In other words, decodable leading pictures use only the initial intra picture or subsequent pictures in decoding order as reference in inter prediction. Non-decodable leading pictures, such as RASL pictures of HEVC, are such that cannot be correctly decoded when the decoding is started from the initial intra picture starting the open GOP.

A stream access point (SAP) sample group as specified in ISOBMFF identifies samples as being of the indicated SAP type. The grouping_type_parameter for the SAP sample group comprises the fields target_layers and layer_id_method_idc. target_layers specifies the target layers for the indicated SAPs. The semantics of target_layers may depend on the value of layer_id_method_idc. layer_id_method_idc specifies the semantics of target_layers. layer_id_method_idc equal to 0 specifies that the target layers consist of all the layers represented by the track. The sample group description entry for the SAP sample group comprises the fields dependent_flag and SAP_type. dependent_flag may be required to be 0 for non-layered media. dependent_flag equal to 1 specifies that the reference layers, if any, for predicting the target layers may have to be decoded for accessing a sample of this sample group. dependent_flag equal to 0 specifies that the reference layers, if any, for predicting the target layers need not be decoded for accessing any SAP of this sample group. sap_type values in the range of 1 to 6, inclusive, specify the SAP type, of the associated samples.

A sync sample may be defined as a sample in a track that is of a SAP of type 1 or 2. Sync samples may be indicated with SyncSampleBox or by sample_is_non_sync_sample equal to 0 in the signaling for track fragments.

Extractors specified in ISO/IEC 14496-15 for H.264/AVC and HEVC enable compact formation of tracks that extract NAL unit data by reference. An extractor is a NAL-unit-like structure. A NAL-unit-like structure may be specified to comprise a NAL unit header and NAL unit payload like any NAL units, but start code emulation prevention (that is required for a NAL unit) might not be followed in a NAL-unit-like structure. For HEVC, an extractor contains one or more constructors. A sample constructor extracts, by reference, NAL unit data from a sample of another track. An in-line constructor includes NAL unit data. The term in-line may be defined e.g. in relation to a data unit to indicate that a containing syntax structure contains or carries the data unit (as opposed to includes the data unit by reference or through a data pointer). When an extractor is processed by a file reader that requires it, the extractor is logically replaced by the bytes resulting when resolving the contained constructors in their appearance order. Nested extraction may be disallowed, e.g. the bytes referred to by a sample constructor shall not contain extractors; an extractor shall not reference, directly or indirectly, another extractor. An extractor may contain one or more constructors for extracting data from the current track or from another track that is linked to the track in which the extractor resides by means of a track reference of type 'scal'. The bytes of a resolved extractor may represent one or more entire NAL units. A resolved extractor starts with a valid length field and a NAL unit header. The bytes of a sample constructor are copied only from the single identified sample in the track referenced through the indicated 'scal' track reference. The alignment is on decoding time, i.e. using the time-to-sample table only, followed by a counted offset in sample number. Extractors are a media-level concept and hence apply to the destination track before any edit list is considered. (However, one would normally expect that the edit lists in the two tracks would be identical).

H.264/AVC does not include the concept of tiles, but the operation like MCTSs can be achieved by arranging regions vertically as slices and restricting the encoding similarly to encoding of MCTSs. For simplicity, the terms tile and MCTS are used in this document but should be understood to apply to H.264/AVC too in a limited manner. In general, the terms tile and MCTS should be understood to apply to similar concepts in any coding format or specification.

A tile base track (e.g. an HEVC tile base track) may be generated and stored in a file. The tile base track represents the bitstream by implicitly collecting motion-constrained tile sets from the tile tracks. A tile base track may include track references to the tile tracks, and/or tile tracks may include track references to the tile base track. For example, in HEVC, the 'sabt' track reference is used to refer to tile tracks from a tile base track, and the tile ordering is indicated by the order of the tile tracks contained by a 'sabt' track reference. Furthermore, in HEVC, a tile track has is a 'tbas' track reference to the tile base track.

Extractors enable compact formation of tracks that extract NAL unit data by reference. An extractor contains one or more constructors, for example, 1) a sample constructor extracts, by reference, NAL unit data from a sample of another track, and 2) an in-line constructor includes NAL unit data.

When an extractor is processed by a file reader that requires it, the extractor is logically replaced by the bytes resulting when resolving the contained constructors in their appearance order. In some embodiments, nested extraction may be disallowed, e.g. the bytes referred to by a sample constructor may not contain extractors; an extractor may not reference, directly or indirectly, another extractor. An extractor may contain one or more constructors for extracting data from the current track or from another track that is linked to the track in which the extractor resides by means of a track reference of type 'scal'.

In an example, the bytes of a resolved extractor are one of the following:
  One entire NAL unit; note that when an Aggregator is referenced, both the included and referenced bytes are copied
  More than one entire NAL unit
  In both cases the bytes of the resolved extractor start with a valid length field and a NAL unit header.

The bytes of a sample constructor are copied only from the single identified sample in the track referenced through the indicated 'scal' track reference. The alignment is on decoding time, i.e. using the time-to-sample table only, followed by a counted offset in sample number. Extractors are a media-level concept and hence apply to the destination track before any edit list is considered. Often times, the edit lists in the two tracks would be identical. The following syntax may be used:

```
class aligned(8) Extractor ( ) {
  NALUnitHeader( );
  do {
    unsigned int(8)    constructor_type;
    if( constructor_type == 0 )
      SampleConstructor( );
    else if( constructor_type == 2 )
      InlineConstructor( );
  } while( !EndOfNALUnit( ) )
}
```

NALUnitHeader( ) is the first two bytes of HEVC NAL units. A particular nal_unit_type value indicates an extractor, e.g. nal_unit_type equal to 49. constructor type specifies the constructor being used. EndOfNALUnit( ) is a function that returns 0 (false) when more data follows in this extractor; otherwise it returns 1 (true). The sample constructor (SampleConstructor) may have the following syntax:

```
class aligned(8) SampleConstructor ( ) {
  unsigned int(8) track_ref_index;
  signed int(8) sample_offset;
  unsigned int((lengthSizeMinusOne+1)*8)
    data_offset;
  unsigned int((lengthSizeMinusOne+1)*8)
    data_length;
}
``` track_ref_index identifies the source track from which data is extracted. track_ref_index is the index of the track reference of type 'scal'. The first track reference has the index value 1; the value 0 is reserved. The sample in that track from which data is extracted is temporally aligned or nearest preceding in the media decoding timeline, i.e. using the time-to-sample table only, adjusted by an offset specified by sample_offset with the sample containing the extractor. sample_offset gives the relative index of the sample in the linked track that may be used as the source of information. Sample 0 (zero) is the sample with the same, or the closest preceding, decoding time compared to the decoding time of the sample containing the extractor; sample 1 (one) is the next sample, sample−1 (minus 1) is the previous sample, and so on. data_offset is the offset of the first byte within the reference sample to copy. If the extraction starts with the first byte of data in that sample, the offset takes the value 0. data_length is the number of bytes to copy.

The syntax of the in-line constructor may be specified as follows:

```
class aligned(8) InlineConstructor ( ) {
  unsigned int(8) length;
  unsigned int(8) inline_data[length];
}
``` length is the number of bytes that belong to the Inline-Constructor following this field. inline_data is the data bytes to be returned when resolving the in-line constructor.

It needs to be understood that even though extractors were described in the context of HEVC, they apply to other codecs and similar concepts as extractors.

An identified media data box may have the same semantics as a MediaDataBox has but it additionally contains an identifier that is used in setting up data references to the contained media data. The identifier may for example be the first element contained by the identified media data box. The syntax of an identified media data box may be specified as follows, where imda_identifier is the identifier of the box. It is noted that while imda_identifier of type 64-bit unsigned integer is used in the syntax, other field lengths and other basic data types (e.g. string) are similarly possible. An example identified meta data box is provided below:

```
aligned(8) class IdentifiedMediaDataBox extends Box('imda') {
  unsigned int(64) imda_identifier;
  bit(8) data[ ]; // until the end of the box
}
```

A box, herein referred to as DataEntryImdaBox, may be used for referencing data in an identified media data box. The DataEntryImdaBox identifies the IdentifiedMediaDataBox containing the media data accessed through the data_reference_index corresponding to this DataEntryImdaBox. The DataEntryImdaBox contains the value of imda_identifier of the referred IdentifiedMediaDataBox. The media data offsets are relative to the first byte of the payload of the referred IdentifiedMediaDataBox. In other words, media data offset 0 points to the first byte of the payload of the referred IdentifiedMediaDataBox. A sample entry contains data_reference_index that identifies which data reference of the DataReferenceBox is in use for containing the samples referencing the sample entry. When an IdentifiedMediaDataBox is used in containing samples, the data_reference_index is set a value pointing to a DataEntryImdaBox. The syntax of DataEntryImdaBox may be specified as follows, where imda_ref_identifier provides an imda_identifier value and thus identifies a particular IdentifiedMediaDataBox:

```
aligned(8) class DataEntryImdaBox (bit(24) flags)
  extends FullBox('imdt', version = 0, flags) {
  unsigned int(64) imda_ref_identifier;
}
```

In an example, an identifier value for the identified media data box of a (Sub)segment or movie fragment is determined and that identifier value is provided as the data reference basis for the media data of the (Sub)segment or movie fragment. In an example, a template scheme for the identifier for the identified media data box is defined to be used as a data reference for sample data, e.g. in DataReferenceBox. The template scheme may be based on but is not limited to the movie fragment sequence number (such as the sequence_number field of the MovieFragmentHeaderBox) or track fragment decode time (such as the baseMediaDecodeTime field of TrackFragmentBaseMediaDecodeTimeBox). It needs to be understood that any identifier provided for a movie fragment or a track fragment may be appropriate for the template scheme in addition to or instead of those described above. In an example, the following syntax may be used for referencing an identified media data box using a template for deriving the identifier.

```
aligned(8) class DataEntryTfdtBasedImdaBox (bit(24) flags)
  extends FullBox('imdt', version = 0, flags) {
}
```

The DataEntryTfdtBasedImdaBox identifies the IdentifiedMediaDataBox containing the media data accessed through the data_reference_index corresponding to this DataEntryTfdtBasedImdaBox. Media data offset 0 points to the first byte of the payload of the IdentifiedMediaDataBox that has imda_identifier equal to baseMediaDecodeTime of the TrackFragmentBaseMediaDecodeTimeBox. 64-bit imda_identifier values are used in order to carry the 64-bit value of baseMediaDecodeTime. If 32-bit baseMediaDecodeTime values are in use, the most-significant bits of the 64-bit imda_identifier may be set to 0. For self-contained movie fragments, the imda_identifier of the IdentifiedMediaDataBox is required to be equal to the baseMediaDecodeTime of TrackFragmentBaseMediaDecodeTimeBox, when the referenced data reference entry is of type DataEntryTfdtBasedImdaBox.

In another example, the following syntax may be used for referencing an identified media data box using a template for deriving the identifier.

```
aligned(8) class DataEntrySeqNumImdaBox (bit(24) flags)
  extends FullBox('snim', version = 0, flags) {
}
```

The DataEntrySeqNumImdaBox identifies the IdentifiedMediaDataBox containing the media data accessed through the data_reference_index corresponding to this DataEntrySeqNumImdaBox. When a data_reference_index included in a sample entry refers to DataEntrySeqNumImdaBox, each sample referring to the sample entry is contained in a movie fragment, and media data offset 0 points to the first byte of the payload of the IdentifiedMediaDataBox that has imda_identifier equal to sequence_number of the MovieFragmentHeaderBox of the movie fragment containing the sample.

The size of the MovieFragmentBox need not be known at the time of determining the base data offset(s) of the track(s) of the movie fragment, and consequently the child boxes of the MovieFragmentBox (e.g. TrackFragmentHeaderBox and TrackRunBoxes) can be authored "progressively" before all coded media data for the movie fragment is available. Moreover, the content encapsulator does not need to estimate the size of the segment header correctly and has the flexibility of some dynamic variability of segment durations.

Media segment header and segment payload may be made separately available by compiling a streaming manifest indicating separate Uniform Resource Locators (URLs) for a segment header and a corresponding segment payload. The streaming manifest, such as DASH Media Presentation Description (MPD), may provide the URL templates, or a URL template scheme to append the base URLs given in the MPD may be indicated to be applicable. In some embodiments, the streaming manifest may further indicate that the data in the segment payload is tightly packed and in decoding order. The segment payload may refer, for example, to the MediaDataBox. Packing tightly refers to all bytes of the segment payload belonging to the video bitstream, i.e. that the segment payload consists of a contiguous range of bytes of the video bitstream. Such indication may be provided e.g. as a supplemental property in DASH MPD. The video bitstream in the segment payload may be an encapsulated video bitstream. For example, the segment payload may consist of a contiguous set of samples of a video track of an ISOBMFF file.

An Index Segment may be defined as a Segment that primarily contains indexing information for Media Segments. The MPD may provide information indicative of URLs that can be used to obtain Index Segments. In the following examples of the information are given:

The RepresentationIndex element within the SegmentBase element specifies the URL including a possible byte range for the Representation Index Segment.

The SegmentList element comprises a number of SegmentURL elements, which may comprise a URL for a Media Segment (in an @media attribute), a byte range within the resource identified by the URL of the @media attribute, a URL for an Index Segment (in an @index attribute), and/or a byte range within the resource identified by the URL of the @index attribute. The URL in the @media attribute in combination with an @mediaRange attribute, if present, specifies the HTTP-URL for the Media Segment. The URL in the @index attribute in combination with an @indexRange attribute, if present, specifies the HTTP-URL for the Index Segment.

The @index attribute of a SegmentTemplate element specifies the template to create the Index Segment List. A segment template comprises a character string from which a list of Segments (identified by their URLs) can be derived. A segment template may comprise specific identifiers that are substituted by dynamic values assigned to Segments, to create a list of Segments.

Each Segment may have assigned Segment Index information that may be provided in an explicitly declared Index Segment. The presence of explicit Index Segment information may be indicated e.g. by any of the following:
  by the presence of one RepresentationIndex element providing the Segment Index for the entire Representation, or
  by the presence of at least one of the two attributes @index and @indexRange in the SegmentList.SegmentURL element, or
  by the presence of SegmentTemplate@index attribute.

The @indexRange attribute may also be used to provide the byte range for an index within a Media Segment, where this is allowed by the Media Segment format. In this case the @index attribute is not present and the range specified lies completely within any byte range specified for the Media Segment. The availability of Index Segments may be identical to the availability to the Media Segments they correspond to.

Many types of content may be captured with several cameras, which may be temporally interleaved to produce a video sequence to be encoded. Such temporally interleaved shots from different cameras may exist for example in movies, sitcoms, late-night talk shows, conferencing, and surveillance. Temporally non-adjacent shots originating from the same camera may have substantial similarity or correlation. However, since each shot conventionally starts with a random-access picture, the similarity between the shots has not been utilized in conventional video compression.

An approach for utilizing the correlation of non-adjacent shorts originating from the same camera has been presented in the JVET-M0360, available in http://phenix.it-sudparis.eu/jvet/doc_end_user/documents/13_Marrakech/wg11/JVET-M0360-v4.zip. In JVET-M0360, Many types of content may be captured with several cameras, which may be temporally interleaved to produce a video sequence to be encoded. Such temporally interleaved shots from different cameras may exist for example in movies, sitcoms, late-night talk shows, conferencing, and surveillance. Temporally non-adjacent shots originating from the same camera may have substantial similarity or correlation. However, since each shot conventionally starts with a random-access picture, the similarity between the shots has not been utilized in conventional video compression.

An approach for utilizing the correlation of non-adjacent shorts originating from the same camera has been presented in the JVET-M0360, available in http://phenix.it-sudparis.eu/jvet/doc_end_user/documents/13_Marrakech/wg11/JVET-M0360-v4.zip. In JVET-M0360, pictures that may be used by multiple random-access segments or shots may be encoded into a separate "library stream". A decoded picture of the library stream may be input to the encoding and decoding of a "main stream" as an additional reference picture.

Another approach for utilizing the correlation of non-adjacent shorts originating from the same camera has been presented in the JVET-N0 119, available in http://phenix.it-sudparis.eu/jvet/doc_end_user/documents/14_Geneva/wg11/JVET-N0119-v2.zip. Some aspects of WET-N0119 are summarized in the following paragraphs.

Pictures that may be used by multiple random-access segments or shots are provided to the encoding and decoding of the "main stream" as coded pictures. The following aspects may exist:

An external decoding refresh (EDR) picture is a random accessible picture (in the "main stream") for which one or more external pictures are needed when random accessing from the picture.

It is specified that an EDR picture may start a CVS and hence may also start a bitstream.

External pictures are provided in the form of coded pictures instead of decoded pictures. External pictures are not output by the decoder; they are for inter prediction referencing only.

A NAL unit type EDR_NUT is defined for EDR pictures.

For each EDR picture, the least significant bit (LSB) and the most significant bit of picture order count (POC) values of the external pictures and the most significant bit of the EDR picture itself may be signalled in a tile group header.

Among the external pictures for the EDR picture, those that are not currently in a decoded picture buffer (DPB) may be provided by external means. The access units containing these external pictures may be inserted into a bitstream to be decoded immediately before the EDR access unit in decoding order.

Some problems may be identified in some approaches which take advantage of cross-shot correlation. For example, library pictures of JVET-M0360 and external pictures of JVET-N0119 require separate encoding process, specific signaling, and decoding process changes. Both methods are only applicable to codecs that implement changes for the encoding, signaling, and decoding.

The functionality is implemented as codec changes, whereas it could be more generally applicable if no changes to the codecs are needed but the functionality could be achieved with system-level signaling applicable to any codecs.

In JVET-M0360 library pictures are supposedly provided to a "main" decoder as decoded pictures. Such an interface to the decoder might not be generally available.

In JVET-N0119 in the probably worst case, when random accessing at an external decoding refresh (EDR) picture, all external pictures are provided to the decoder as coded pictures. A shortcut on using already decoded external pictures available in a decoded picture buffer (DPB) may not help.

Now improved methods are introduced in order to at least alleviate the above problems. The improved methods are generally intended to take advantage of correlation between non-adjacent shots originating from the same camera in video compression but may have other benefits and may be used for other purposes.

According to an embodiment, a processing entity obtains an intra random access point picture from a first location of a coded video bitstream. The processing entity determines whether the intra random access point picture is reusable in at least a second location of the coded video bitstream, the at least second location differing from the first location. If it is determined that the intra random access point picture is reusable, the processing entity provides an identification assigned with the intra random access point picture that the intra random access point picture is a reusable intra random access point picture.

The processing entity may for example be an encoder, a file creator (that encapsulates the coded video bitstream into a container file), or an entity that converts a track (encapsulating the coded video bitstream) into (Sub)segments.

In an embodiment, obtaining the intra random access point picture comprises encoding the intra random access point picture.

In an embodiment, an encoder reuses the intra random access picture in the second location of the bitstream by including the same slice data in the first location and in the second location. As a result, the same intra random access point picture essentially appears multiple times in the bitstream, with potential differences in image segment headers, such as differing values for pic_output_flag and/or syntax element(s) used for deriving picture order count.

In an embodiment, an encoder determines that all intra random access point pictures are reusable when they are encoded. However, on the course of the encoding process the encoder may choose to reuse or not to reuse a specific reusable intra random access point picture.

In an embodiment, a processing entity receives a coded video bitstream. The processing entity parses or decodes at least a portion of the coded video bitstream for obtaining the intra random access point picture from the first location of the coded video bitstream.

In an embodiment, the processing entity determines that all intra random access point pictures are reusable when they are processed (e.g. parsed).

In an embodiment, the processing entity analyzes the coded video bitstream to discover if the slice data (or the image segment payloads or alike) is identical in another intra random access point picture in the second location of the coded video bitstream. Consequently, the processing entity determines to that the intra random access point picture is a reusable intra random access point picture.

Identification of a reusable IRAP picture may be provided in or along the bitstream and may include but is not limited to one or more of the following:

The identification may be an ID value chosen by or given to the encoder ("IRAP ID" or "SAP ID", which may be used interchangeably).

The identification may be a checksum of the coded picture content (e.g. all slice data). For example, an MD5 checksum may be used.

An identification of a reusable IRAP picture may be carried in or along the bitstream for example using, but not limited to, the following method. When the reusable IRAP picture is included in the bitstream, the identification could be included in an SEI message. For example, a coded picture hash SEI message may be defined and the SEI message syntax may comprise an identification of a coded picture that is a checksum over all slice data.

A hash function may be defined as is any function that can be used to map digital data of arbitrary size to digital data of fixed size, with slight differences in input data possibly producing big differences in output data. A cryptographic hash function may be defined as a hash function that is intended to be practically impossible to invert, i.e. to create the input data based on the hash value alone. Cryptographic hash function may comprise e.g. the MD5 function. An MD5 value may be a null-terminated string of UTF-8 characters containing a base64 encoded MD5 digest of the input data. One method of calculating the string is specified in IETF RFC 1864. It should be understood that instead of or in addition to MD5, other types of integrity check schemes could be used in various embodiments, such as different forms of the cyclic redundancy check (CRC), such as the CRC scheme used in ITU-T Recommendation H.271.

A checksum or hash sum may be defined as a small-size datum from an arbitrary block of digital data which may be used for the purpose of detecting errors which may have been introduced during its transmission or storage. The actual procedure which yields the checksum, given a data input may be called a checksum function or checksum algorithm. A checksum algorithm will usually output a significantly different value, even for small changes made to the input. This is especially true of cryptographic hash functions, which may be used to detect many data corruption errors and verify overall data integrity; if the computed checksum for the current data input matches the stored value of a previously computed checksum, there is a high probability the data has not been altered or corrupted.

The term checksum may be defined to be equivalent to a cryptographic hash value or alike.

Some example embodiments for carriage the identification in ISOBMFF and/or DASH will be provided below in this specification.

Identification of a reusable IRAP picture may enable receivers and/or decoders to detect a reusable IRAP picture. Consequently, a reusable IRAP picture need not be transmitted again if it has already been received and/or a reusable IRAP picture need not be decoded again in case it is already decoded.

According to an embodiment, a processing entity receives an identification associated with an intra random access point picture in a first location of a coded video bitstream, the identification determining whether the an intra random access point picture is reusable in at least a second location of the coded video bitstream, the at least second location differing from the first location. If the identification indicates that the intra random access point picture is reusable, the processing entity examines whether a corresponding, previously received intra random access point picture is available. If the examination reveals that the corresponding, previously received intra random access point picture is available, omitting processing the intra random access point picture.

In an embodiment, the corresponding, previously received intra random access point picture has a second identification associated with it. The processing entity receives the second identification. As part of the examination, the processing entity compares the identification and the second identification, and if they are equal and if the previously received intra random access point picture is available, the processing entity concludes the examination to reveal that the corresponding, previously received intra random access point picture is available.

In an embodiment, if the examination reveals that the first intra random access point picture is available, the processing entity omits processing of the intra random access point picture, such as omits requesting, receiving, storing, and/or decoding the intra random access point picture. In an embodiment, if the examination reveals that the intra random access point picture is available as a decoded picture, the processing entity omits decoding of the intra random access point picture and instead uses the corresponding, previously received and decoded intra random access point picture as a reference picture for decoding subsequent coded pictures in decoding order.

According to an embodiment, a processing entity receives a first intra random access point picture from a first location of a coded video bitstream and a first identification associated with the first intra random access point picture. The processing entity receives a second identification associated with a second intra random access point picture residing in a second location of the coded video bitstream. As a response to the first identification being equal to the second identification, the processing entity concludes that the first intra random access point picture is reused in the second location and examines whether the first intra random access point picture is available (e.g., received and kept in a buffer). If the examination reveals that the first intra random access point picture is available, using the first intra random access point picture in place of the second intra random access point picture.

In an embodiment, if the examination reveals that the first intra random access point picture is available, the processing entity omits processing of the second intra random access point picture, such as omits requesting and/or receiving the second intra random access point picture. In an embodiment, if the examination reveals that the first intra random access point picture is available as a decoded picture, the processing entity omits decoding of the first intra random access point picture in place of the second intra random access point picture and instead uses the decoded first intra random access point picture as a reference picture for decoding subsequent coded pictures in decoding order.

The processing entity may for example be a decoder, a receiver, a player, a streaming client, a file parser (that decapsulates the coded video bitstream from a container file), or an entity that processes received (Sub)segments.

The identification of a reusable IRAP picture may be regarded as one piece of metadata characterizing the reusable IRAP picture. Additional metadata characterizing a reusable IRAP picture are described in the following. Additional metadata characterizing a reusable IRAP picture may comprise but are not limited to:

Stream Access Point type for the reusable IRAP picture
Byte range for the reusable IRAP picture; if aligned with the start of the (Sub)segment, byte range or size of the initial SAP sample may be provided
Byte range for non-IRAP pictures associated with the IRAP picture
  In an embodiment, byte ranges for leading and trailing pictures are provided separately
Decoding timestamp and/or composition timestamp for the reusable IRAP picture The additional metadata may be regarded as an integral part of the identification of a reusable IRAP picture, may accompany the identification of a reusable IRAP picture e.g. within the same syntax structure and/or signalling mechanism, or may be carried separately from the identification of a reusable IRAP picture.

In the following, ISOBMFF and DASH embodiments will be described.

ISOBMFF and DASH embodiments may be categorized into two classes of approaches:

In a first category, reusable IRAP pictures appear (repeatedly) in a conventional video track, DASH Representation, or alike. Extra signaling is present that enables to avoid unnecessary downloading of reusable IRAP pictures and to identify which reusable IRAP picture can be used instead of the one not downloaded. This category is backward compatible, i.e. legacy players may process the track or Representation. Several embodiments falling into this category are presented below.

In a second category, reusable IRAP pictures are located in a Representation of their own. The "main" Representation does not contain reusable IRAP pictures and is indicated to depend on the Representation with reusable IRAP pictures e.g. using the @dependencyId attribute of DASH and/or a track reference. SAPs of the reusable IRAP picture Representation may be defined to be such locations that no reusable picture preceding the SAP is used as reference for any picture at or after the SAP. This approach is backward compatible but requires players to support processing of dependent Representations and/or the track references.

In the following, some embodiments related to the above mentioned first category will now be explained in more detail.

In a first embodiment of the first category, timed metadata track with metadata on reusable IRAP pictures, a timed metadata track carries the identification of reusable IRAP pictures and associated metadata.

Timed metadata track samples may indicate but are not restricted to one or more of the following indications for a reusable IRAP picture output flag (containing the value of pic_output_flag in the slice headers of the IRAP picture)

identification of the reusable IRAP picture, such as IRAP ID byte range within the Media Segment Each (Sub)segment of the timed metadata track may be selected or required to cover an integer number of adjacent (Sub)segments of the referenced media track.

A player can operate as follows:

The player stores received reusable IRAP pictures separately and can access them through their ID. The player receives (Sub)segments of the timed metadata track. When the player notices from the timed metadata track that the next Media (Sub)segment to be requested contains a reusable IRAP picture that the player already has stored, the player requests byte ranges of the next Media (Sub)segment excluding the reusable IRAP picture. The player can concatenate the received byte ranges and the stored reusable IRAP pictures (as stored in media samples originally) and process this concatenated MediaDataBox in a conventional manner. If the value of output flag of the stored reusable IRAP picture differs from the value of the output flag of the IRAP picture in this (Sub)segment, the value of pic_output_flag needs to be rewritten.

Alternatively, instead of requesting byte ranges of the next Media (Sub)segment excluding the reusable IRAP picture, the decoder may store decoded versions of reusable IRAP pictures and omit their decoding again if they are already available as a decoded picture.

In a second embodiment of the first category, an extension of SegmentIndexBox is utilized.

In this embodiment, SegmentIndexBox is extended at the end of the current syntax of the SegmentIndexBox. Legacy parsers are expected to stop parsing before the extension.

The extension may provide but is not limited to one or more of the following:

The movie fragment header size of an indexed (leaf) Subsegment;

If the indexed Subsegment starts with a SAP, the SAP may be considered as a reusable IRAP picture, and the extension may provide but is not limited to one or more of the following for the reusable IRAP picture:

the identification of the reusable IRAP picture (hereafter SAP ID);

the size of the reusable IRAP picture e.g. in bytes;

SAP output flag (containing the value of pic_output_flag).

The movie fragment header size can be used to conclude a byte range to fetch the movie fragment header. The movie fragment header size may, for example, comprise all boxes from the start of the (Sub)segment until and excluding the start of the MediaDataBox containing the media data for the movie fragment.

The SAP ID may be used to conclude if the respective reusable IRAP picture has already been received.

The SAP size (in bytes) can be used to avoid its downloading, i.e. to request a byte range starting with the sample following the SAP sample.

If the SAP output flag has a different value than that of the already received SAP picture, pic_output_flag in the already received SAP picture needs rewriting.

Several example embodiments are provided below including a specific syntax. It needs to be understood that other embodiments could be similarly realized.

An example for indicating SAP IDs and SAP sizes is included below.

```
aligned(8) class SegmentIndexBox extends FullBox('sidx', version, flags) {
    unsigned int(32) reference_ID;
    unsigned int(32) timescale;
    if (version==0) {
        unsigned int(32) earliest_presentation_time;
        unsigned int(32) first_offset;
    }
    else {
        unsigned int(64) earliest_presentation_time;
        unsigned int(64) first_offset;
    }
    unsigned int(16) reserved = 0;
    unsigned int(16) reference_count;
    for(i=1; i <= reference_count; i++)
    {
        bit (1)                         reference_type;
        unsigned int(31)                referenced_size;
        unsigned int(32)                subsegment_duration;
        bit(1)                          starts_with_SAP;
        unsigned int(3)                 SAP_type;
        unsigned int(28)                SAP_delta_time;
    }
    max_SAP_type_with_SAP_id = flags & 7;
    if (max_SAP_type_with_SAP_id)
        for(i=1; i <= reference_count; i++)
            if (reference_type == 0 && starts_with_SAP &&
                SAP_type <= max_SAP_type_with_SAP_id) { // of the same value of i
                unsigned int(32) SAP_id;
                unsigned int(32) SAP_size;
            }
}
```

With max_SAP_type_with_SAP_id the signalling of SAP IDs and SAP sizes can be limited to certain SAP types only, such as for SAP types 1 and 2 only, for which max_SAP_type_with_SAP_id may be selected to be equal to 2.

In another example, movie fragment header size, SAP output flag, SAP ID, and SAP size are indicated. A selectable number of bits is allocated for indicating movie fragment header size, SAP ID, and SAP size. The function f( ) may be specified for example to yield f(0)=0; f(1)=8; f(2)=16; and f(3)=32.

```
aligned(8) class SegmentIndexBox extends FullBox('sidx', version, flags) {
    ... // appending at the end of the box
    SAP_id_len = f(flags & 3);
    SAP_size_len = f((flags >> 2) & 3) − 1;
    mf_hdr_size_len = f((flags >> 4) & 3);
    if (SAP_id_len)
        for(i=1; i <= reference_count; i++)
            if (reference_type == 0) {
                unsigned int(mf_hdr_size_len) mf_hdr_size;
                if (starts_with_SAP) {
                    unsigned int(1) SAP_output_flag;
                    unsigned int(SAP_id_len) SAP_id;
                    unsigned int(SAP_size_len) SAP_size;
                }
            }
}
```

In a third embodiment of the first category, sample groups are utilized.

In this embodiment, a sample group is created to contain the identification for reusable IRAP pictures and is carried in the "main" video track.

Sample group description (i.e. SampleGroupDescription-Box) for the created sample group may comprise a distinct sample group description entry for each IRAP ID value.

In an example, the following sample group description entry syntax is used (wherein sap_id contains the IRAP ID value):

```
class SAPIdentifierEntry( ) extends SampleGroupDescriptionEntry('said') {
    unsigned int(32) sap_id;
}
```

In an embodiment, an output flag is or may be provided in the sample group description entry too. Thus, two sample group description entries may have the same IRAP ID value, with different output flag value.

In an embodiment, the sample group description entry of the SAP sample group is appended with the IRAP ID. For example, the following sample group description entry syntax may be used:

```
    class SAPEntry( ) extends SampleGroupDescriptionEntry('sap')
    {
        unsigned int(1) dependent_flag;
        unsigned int(3) sap_id;
        unsigned int(1) repeated_flag;
        unsigned int(3) sap_type;
    }
```

In another example, the following sample group description entry syntax may be used:

```
    class SAPEntry( ) extends SampleGroupDescriptionEntry('sap')
    {
        unsigned int(1) dependent_flag;
        unsigned int(2) sap_id;
        unsigned int(1) repeated_flag;
        unsigned int(4) sap_type;
    }
```

The semantics of dependent_flag and sap_type may be specified as described earlier. sap_id may contain the IRAP ID or SAP ID value. repeated_flag equal to 1 specifies that the coded picture is identical to the previous coded picture with the same sap_id value in decoding order. repeated_flag equal to 0 specifies that the coded picture may be the first occurrence of the coded picture in decoding order.

A player can operate as follows:

The player stores received reusable IRAP pictures separately, and can access them through their ID. The player requests and receives the movie fragment header of a (Sub)segment of a Media Representation. When the player notices from the SampleToGroupBox included in the movie fragment header that the next Media (Sub)segment to be requested contains a reusable IRAP picture that the player already has stored, the player requests byte ranges of the next Media (Sub)segment excluding the reusable IRAP picture. The player can concatenate the received byte ranges and the stored reusable IRAP pictures (as stored in media samples originally) and process this concatenated Media-DataBox in a conventional manner. If the value of output flag of the stored reusable IRAP picture differs from the value of the output flag of the IRAP picture in this (Sub) segment, the value of pic_output_flag needs to be rewritten.

Alternatively, instead of requesting byte ranges of the next Media (Sub)segment excluding the reusable IRAP picture, the decoder may store decoded versions of reusable IRAP pictures and omit their decoding again if they are already available as a decoded picture.

In a fourth embodiment of the first category, extractors are utilized.

When a reusable IRAP picture has been present in the bitstream earlier, it may be included in the sample of a track by reference, e.g. using an extractor NAL-unit-like structure that specifies the sample from which the coded picture is fetched.

In a first approach the first occurrence of the reusable IRAP picture is included in the "main" video track. An extractor references the first occurrence, i.e. the same track that also contains the extractor itself. With the present extractor syntax of ISO/IEC 14496-15, this approach is limited by the 8-bit sample_offset, i.e. the first occurrence of the reusable IRAP picture cannot be far from the later occurrences without changes in the extractor syntax. However, other extractor syntaxes may exist or may be created where the limitation may not exist or may be different from the 8-bit sample_offset.

In a second approach, the reusable IRAP pictures are included in their own track(s). Consequently, a reusable IRAP picture can be extracted to a current sample of the "main" video track as long as the extracted IRAP picture is within −128 to 127 reusable IRAP pictures apart from the current sample. An advantage of this approach is that it uses an existing mechanism, which some legacy players may readily support. However, the (Sub)segment containing the reusable IRAP picture to be extracted is not explicitly indicated but might be concluded e.g. from the sample_offset, frame rate, and (Sub)segment duration.

In a fifth embodiment of the first category, SubsegmentIndexBox and related structures and/or signaling are utilized. In this embodiment, reusable IRAP pictures starting a Subsegment are assigned to different levels than the other pictures.

In an embodiment, a new level assignment type for the Level Assignment box is defined for the purpose of assigning reusable IRAP pictures to different levels than other pictures.

In an embodiment, a certain range of level values serve as IRAP ID values. For example, it may be specified that level equal to 255 indicates pictures other than reusable IRAP pictures, and level values from 0 to 254, inclusive, are used for indicating the IRAP ID value. Consequently, when a level value in the range of 0 to 254, inclusive, is indicated in the SubsegmentIndexBox, the respective range syntax element indicates the byte range of the reusable IRAP picture.

In an embodiment, the level assignment type referencing a sample grouping of a track may be used together with an appropriate sample group e.g. as discussed above in the third embodiment of the first category.

Consequently, in the above-described embodiments, the SubsegmentIndexBox provides (for a Subsegment) the range in bytes for reusable IRAP picture starting the Subsegment and the range in bytes for the other pictures.

The third and fifth embodiments of the first category may be combined, wherein the sample group provides mapping of the samples as reusable IRAP pictures and the IRAP ID values or alike, and the SubsegmentIndexBox provides the byte ranges for reusable IRAP pictures and other pictures.

In a sixth embodiment of the first category, a new box is defined to accompany SegmentIndexBox. The new box is hereafter called SapIdentificationBox but could likewise have another name. SapIdentificationBox provides SAP ID values and their byte ranges of the indexed Subsegment. SapIdentificationBox may additionally provide additional metadata for reusable IRAP pictures. The reusable IRAP pictures described by SapIdentificationBox may be limited to those starting a Subsegment. A SapIdentificationBox, if any, may be required to be the next box after the associated SegmentIndexBox and SubsegmentIndexBox, if any. A SapIdentificationBox documents the Subsegment that is indicated in the immediately preceding SegmentIndexBox.

In various embodiments above, it may be advantageous to conclude the movie fragment header size to fetch the movie fragment header and the media data of the movie fragment (excluding a reusable IRAP picture) separately. The movie fragment header size may, for example, comprise all boxes from the start of the (Sub)segment until and excluding the start of the MediaDataBox containing the media data for the movie fragment. In addition to or instead of above-described mechanisms for indicating the movie fragment header size, one or more of the following mechanisms may be used:
  Indicating the movie fragment header as an Index Segment using DASH MPD mechanisms described earlier (e.g. the RepresentationIndex element or the @indexRange attribute).
  Providing the byte range of the movie fragment header using the DASH MPD mechanism(s) described earlier. Specifically, The @indexRange attribute may be used to provide the byte range for an index within a Media Segment, and the index may be defined to comprise the movie fragment header.

In the following, some alternative HRD parameters omitting the buffering of a reusable IRAP picture will be described.

According to an embodiment, which may be used independently of or together with other embodiments, an encoder encodes, in or along the bitstream, and/or a decoder decodes, from or along the bitstream, alternative Hypothetical Reference Decoder (HRD) parameters without the coded picture buffer (CPB) buffering of a reusable IRAP picture. Decoders that already have the reusable IRAP picture buffered and/or available may use these alternative HRD parameters (instead of "normal" HRD parameters comprising the receiving of the reusable IRAP picture into the CPB). In an embodiment, these alternative parameters apply when the decoding is started from the reusable IRAP picture. The alternative parameters may comprise but are not limited to one or more initial delay(s), such as an initial CPB buffering delay, and/or one or more buffer size(s). The alternative parameters may be carried e.g. in a buffering period SEI message.

Controlling the buffering of a reusable IRAP picture in the coded picture buffer (CPB) will now be described.

According to an embodiment, which may be used independently of or together with other embodiments, a reusable IRAP picture is left in the CPB after its decoding to be potentially re-decoded later.

Embodiments may include control signals to leave a coded picture in the CPB after its decoding, re-decode a coded picture from the CPB, or remove a coded picture from the CPB.

An encoder according to embodiment(s) includes one or more of the above-described control signals in or along the bitstream. An encoder operates its CPB according to the control signals.

A decoder according to embodiment(s) decodes one or more of the above-described control signals from or along the bitstream. A decoder operates its CPB according to the control signals.

In the following, usage of multiple independent layers will be described.

According to an embodiment, an encoder chooses to include temporally correlated pictures into a same independent layer.

Metadata indicating which camera each picture originates from may accompany the video given as input to the encoder. In that case, the encoder may choose to include pictures originating from the same camera into a same independent layer.

If camera source metadata is not accompanying the video given as input to the encoder, the encoder may operate as follows for concluding which input pictures are temporally correlated with each other so that they are chosen to be included in a same independent layer. The encoder may perform shot boundary detection between successive pictures. When a picture is determined to start a new shot, the encoder may perform shot boundary detection between that picture and selected pictures (e.g. those that were coded as IRAP pictures) from earlier shots. When correlation between a picture that starts a shot and an earlier picture in an earlier shot is found, the encoder may determine the shots to be temporally correlated and choose to include them into a same independent layer.

In an embodiment, a picture starting a temporally contiguous "segment" or shot within an independent layer is coded as a dependent random access point (DRAP) picture, i.e. a trailing picture that only references the previous IRAP picture within the independent layer in its decoding process. Provided the necessary parameter sets are available when they need to be activated and that the associated IRAP picture is available, the DRAP picture and all subsequent pictures in decoding order can be correctly decoded without performing the decoding process of any pictures that precede the DRAP picture in decoding order, other than the associated IRAP picture. An encoder may indicate in or along the bitstream, e.g. with an SEI message, that the picture is a DRAP picture.

The embodiment may be illustrated as depicted in FIG. 1b. In this example, there are three layers. In the bitstreams of each layer there are intra random access point pictures followed at a later time instance dependent random access point pictures. The dependent random access point pictures are predicted from the previous intra random access point pictures of the same layer.

This embodiment enables random-accessing the bitstream at a DRAP picture (of any independent layer) by obtaining the previous IRAP picture in that independent layer, decoding that previous IRAP picture, and then decoding the bitstream in decoding order starting from the DRAP picture. The random-accessing may for example be performed as a response to an end-user seeking to a time position of or close to the DRAP picture.

In an embodiment, there may be one or more reference pictures used in decoding a railing picture starting a temporally contiguous "segment" or shot within an independent layer that need not be the preceding IRAP picture. In other words, a picture starting a temporally contiguous "segment" or shot within an independent layer may be a trailing picture and need not be coded as a dependent random access point (DRAP) picture. This embodiment may provide better compression performance than the embodiment wherein DRAP pictures are used but does not provide the random-access functionality in a similarly straightforward manner.

Embodiments may comprise indication(s) or control signal(s) (e.g. in VPS) indicative of one or more of the following:
 Layers are time-interleaved. In other words, each access unit contains a coded picture of exactly one layer only.
 Output of the layers is intended to be done as a single picture sequence.
 Constraint on the joint DPB usage of the layers (e.g. no more than level limit of any single layer).
 Indication or control signal that the layers share the same CPB.
 Indication or control signal that the layers share the same DPB.
 CPB parameters when a single CPB for all involved layers is used.
 DPB parameters when a single DPB for all involved layers is used.
 Profile, tier, and/or level needed for decoding using a single decoder instance.

In an embodiment, the above-described indication(s) or control signal(s) are indicated per output layer set. For example, the VPS syntax may comprise a loop over all the output layer sets, and one or more of the above-described indications may be indicated for each loop entry, wherein a loop entry corresponds to an output layer set. In an embodiment, the above-described indication(s) or control signal(s) are indicated per a set of layers, possibly among multiple sets of layers. In an embodiment, the above-described indication(s) or control signal(s) are indicated for a bitstream.

An encoder according to embodiment(s) includes one or more of the above-described indication(s) or control signal(s) in or along the bitstream. An encoder operates in a manner that the indication(s) or control signal(s) is/are obeyed.

A decoder according to embodiment(s) decodes one or more of the above-described indication(s) or control signal(s) from or along the bitstream. A decoder operates in a manner that the indication(s) or control signal(s) is/are obeyed. For example, as a response of an indication or control signal to output of the layers to be done as a single picture sequence, a decoder outputs decoded pictures as a single picture sequence.

In an embodiment, a decoder decodes indication(s) or control signal(s) (e.g. from VPS) indicative that the layers are time-interleaved. As a consequence of decoding indication(s) or control signal(s) (e.g. from VPS) indicative that the layers are time-interleaved, the decoder executes a single decoder instance that decodes all the layers (in the scope of the indications or the control signals). If the indication(s) or control signal(s) are specific to an output layer set or alike, the decoder may exclude layers not among the output layer set or alike from the bitstream and decode the remaining bitstream. Such a sub-bitstream extraction process may be performed for portions of a bitstream at a time, or may be performed for the entire bitstream. As a part of the decoding with a single decoder instance, reference picture marking is performed layer-wise. For example, an IDR picture at a particular layer causes earlier pictures, in decoding order, within that layer to be marked as "unused for reference" or is required to have RPL/RPS signaling causing earlier pictures, in decoding order, within tat layer to be marked as "unused for reference", while the IDR picture has no impact on pictures at other layers.

In an embodiment, an encoder encodes in or along the bitstream and/or a decoder decodes from or along the bitstream an end of random-access segment (ERAS) signal (e.g. NAL unit). The ERAS NAL unit or alike may be the last NAL unit of or associated with a coded picture or an access unit that is the last coded picture or an access unit of a RAS or a shot or a contiguous sequence of pictures not interleaved with picture of other independent layers.

In an embodiment, in the encoding process and/or in the decoding process, the ERAS NAL unit or alike causes marking all pictures as "unused for reference" except the previous IRAP picture of the same independent layer, in decoding order.

In an embodiment, an encoder encodes in or along the bitstream (e.g. in the ERAS NAL unit) and/or a decoder decodes from or along the bitstream (e.g. in the ERAS NAL unit) reference picture list (RPL) or reference picture set (RPS) signalling that is executed and/or applies after the last coded picture associated with the ERAS NAL unit or alike has been decoded.

In an embodiment, the encoder encodes RPL/RPS signalling applying after the last coded picture of a shot in a manner that the previous IRAP picture of the same independent layer, in decoding order, is marked as "used for reference" or "used for short-term reference" or "used for long-term reference" or alike, and the other decoded reference pictures of the same independent layer are marked as "unused for reference". This embodiment may be used in connection with coding a DRAP picture as the first picture in a subsequent shot of the same independent layer, as described above in an embodiment.

In an embodiment, the encoder encodes RPL/RPS signalling applying after the last coded picture of a shot in a manner that selected picture(s) marked as "used for reference" or "used for short-term reference" or "used for long-term reference" or alike, and the other decoded reference pictures of the same independent layer are marked as "unused for reference". The number of the selected picture(s) may be chosen to be small to limit the memory consumption for decoded reference pictures. This embodiment may be used in connection with coding a trailing picture as the first picture in a subsequent shot of the same independent layer, as described above in an embodiment.

In an embodiment, specific indication(s) are provided in or along the bitstream to indicate a cross-layer random-access point (CL-RAP), which may be characterized in that no picture (in any layer) preceding the CL-RAP is needed in the decoding process for decoding any picture (in any layer) at or subsequent to the CL-RAP, in decoding order. These indication(s) may be generated by encoders or other entities (e.g. file creators or splicers concatenating portions of bitstreams) and may be utilized and/or obeyed by decoders. In some embodiments, these indication(s) may be used for particular picture type(s) or NAL unit type(s) only, such as only for IRAP pictures, while in other embodiments these indication(s) may be used for any picture type(s).

Said indication(s) may for example reside in one or more of the following syntax structures in the bitstream:
NAL unit header
Slice header
Picture parameter set
Picture header
Access unit delimiter Said indication(s) may for example reside in one or more of the following syntax structures along the bitstream:
A sample group in a file encapsulating the bitstream.
A sample of a timed metadata track associated with a track encapsulating one or more layers of the bitstream.
SegmentIndexBox, SubsegmentIndexBox, or another box indexing or providing metadata for a Subsegment encapsulating a portion of the bitstream.
It may be specified that a sync sample of a track encapsulating the bitstream or an output layer set that the indication(s) concern corresponds to a CL-RAP. Consequently, the SyncSampleBox or the sync sample indications within track fragments may be used to indicate CL-RAPs.
It may be specified that a SAP of a track encapsulating the bitstream or an output layer set that the indication(s) concern corresponds to a CL-RAP. Consequently, the SAP sample group wherein the grouping_type_parameter indicates the concerned layers may be used to indicate CL-RAPs.

In an embodiment, a decoder, a player, or alike parses above-described indication(s) to conclude CL-RAP positions. The decoder, the player, or alike uses CL-RAPs e.g. for random-accessing, initiating decoding, seeking, fast-forward play, and/or reverse play.

Figure 2B:
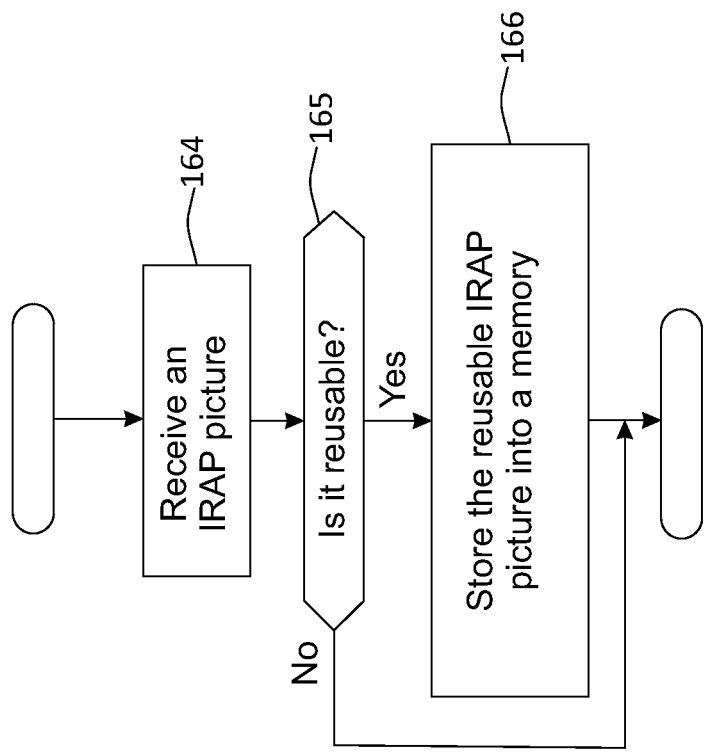
FIG. 2b is a flowchart illustrating a decoding method according to an embodiment.
Figure 2A:
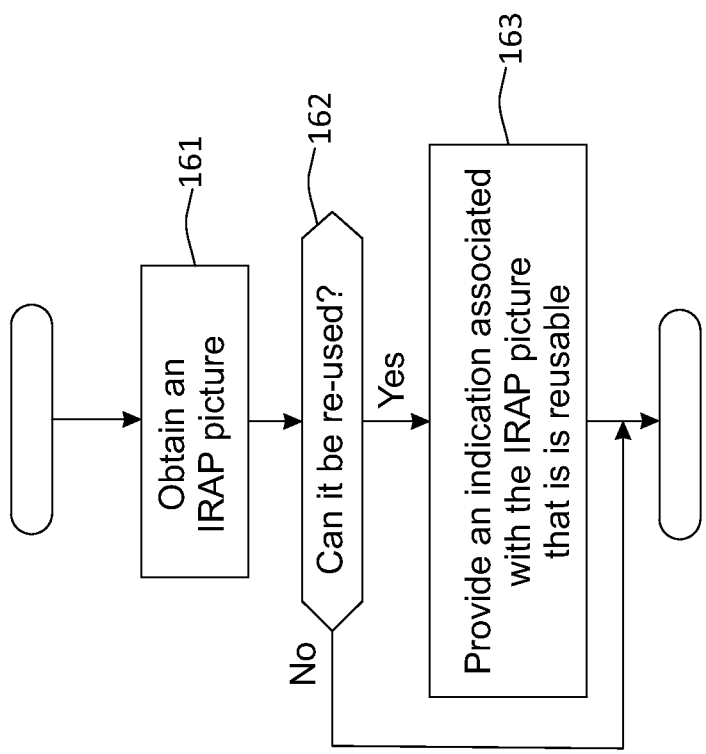
FIG. 2a is a flowchart illustrating an encoding method according to an embodiment.

FIG. 2a is a flowchart illustrating an encoding method according to an embodiment. The method comprises obtaining 161 an intra random access picture. It may then be examined 162 whether the IRAP picture can be re-used and if so, providing 163 an indication associated with the IRAP picture that it is reusable IRAP picture.

FIG. 2b is a flowchart illustrating a decoding method according to an embodiment. The method comprises receiving 164 an intra random access picture. It may then be examined 165 whether the IRAP picture can be re-used and if so, storing 166 the re-usable IRAP picture into a memory.

Figure 2C:
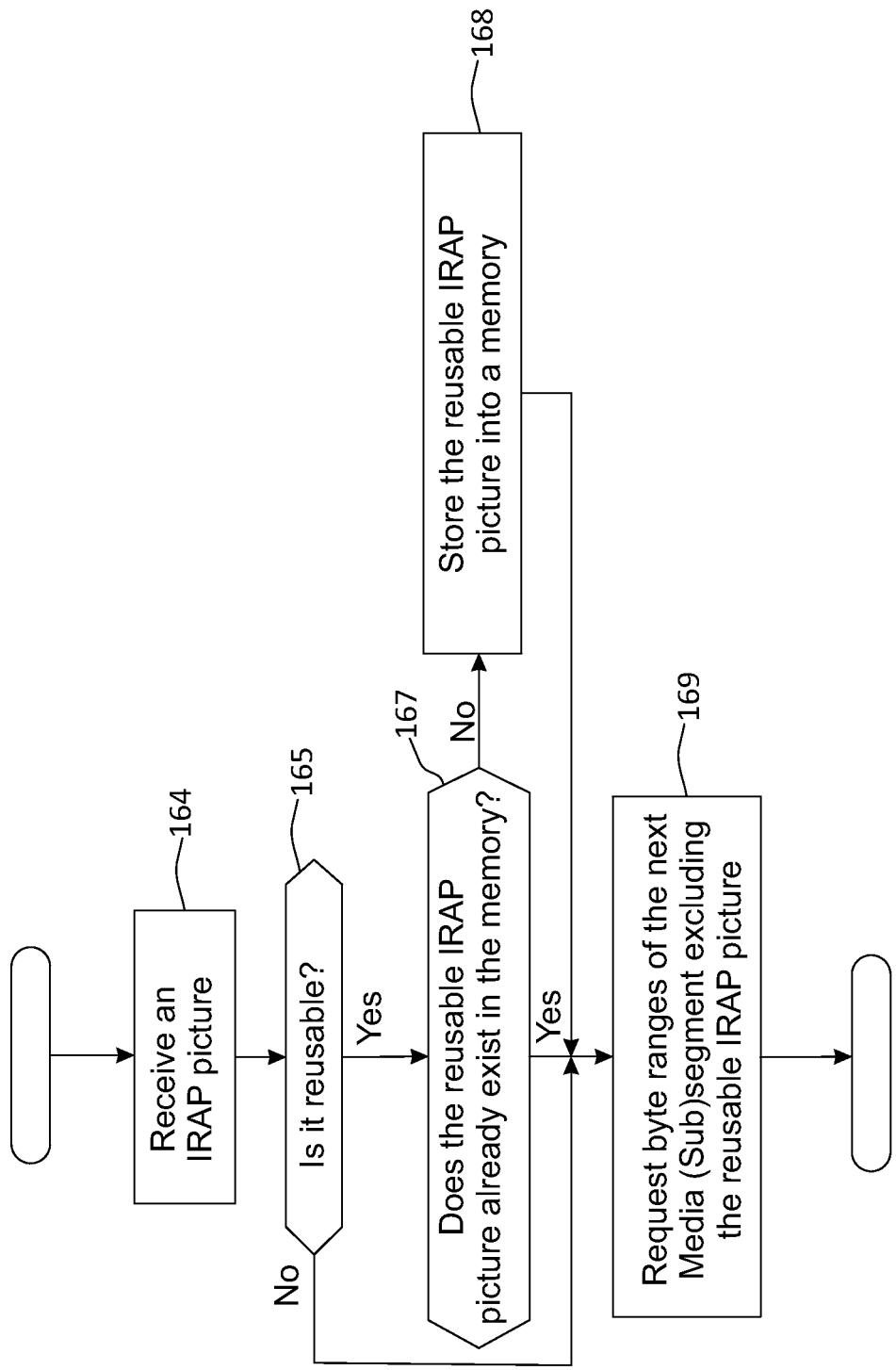
FIG. 2c is a flowchart illustrating a decoding method according to another embodiment.
Figure 3A:
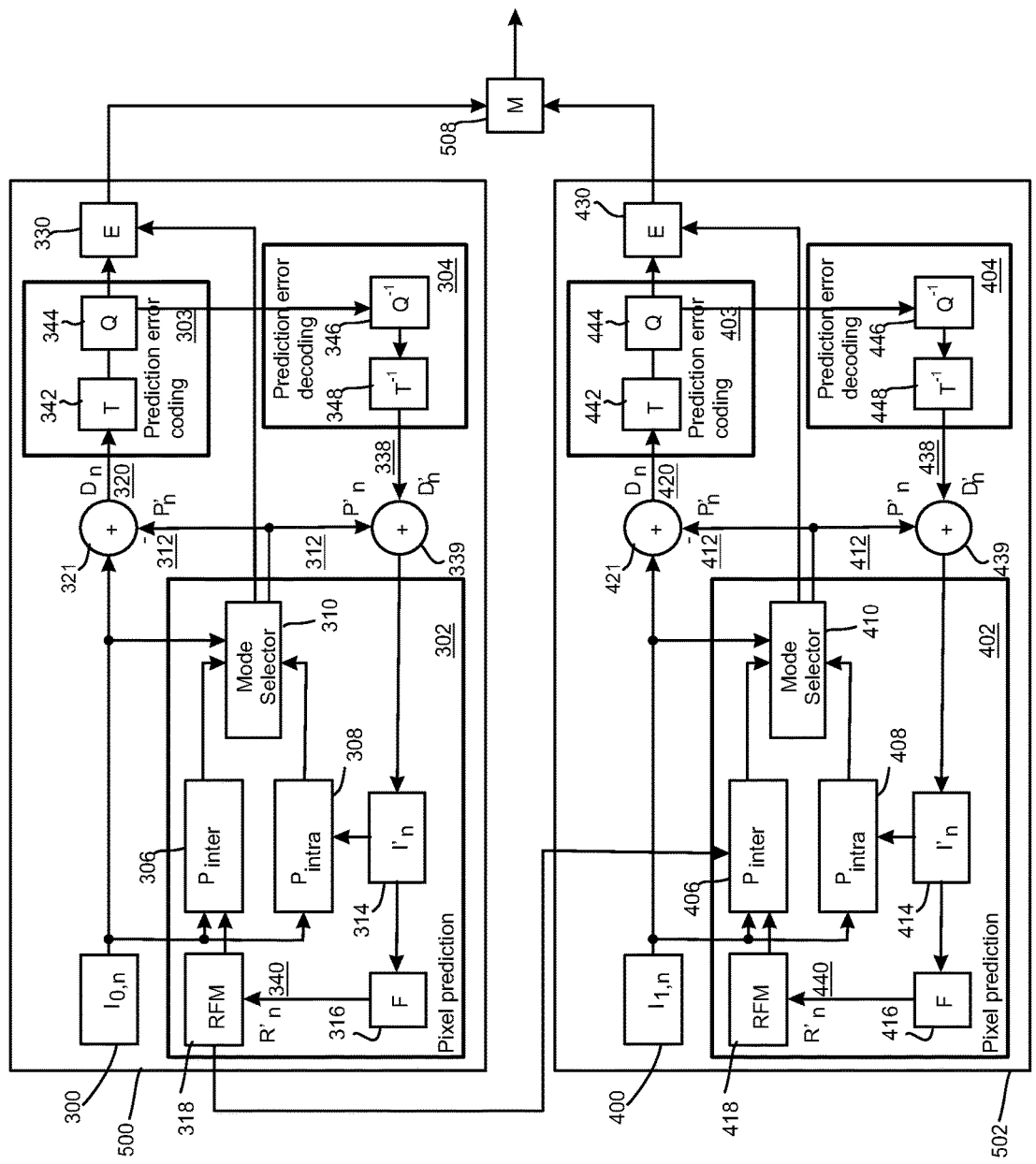
FIG. 3a shows a schematic diagram of an encoder suitable for implementing embodiments of the invention.
Figure 3B:
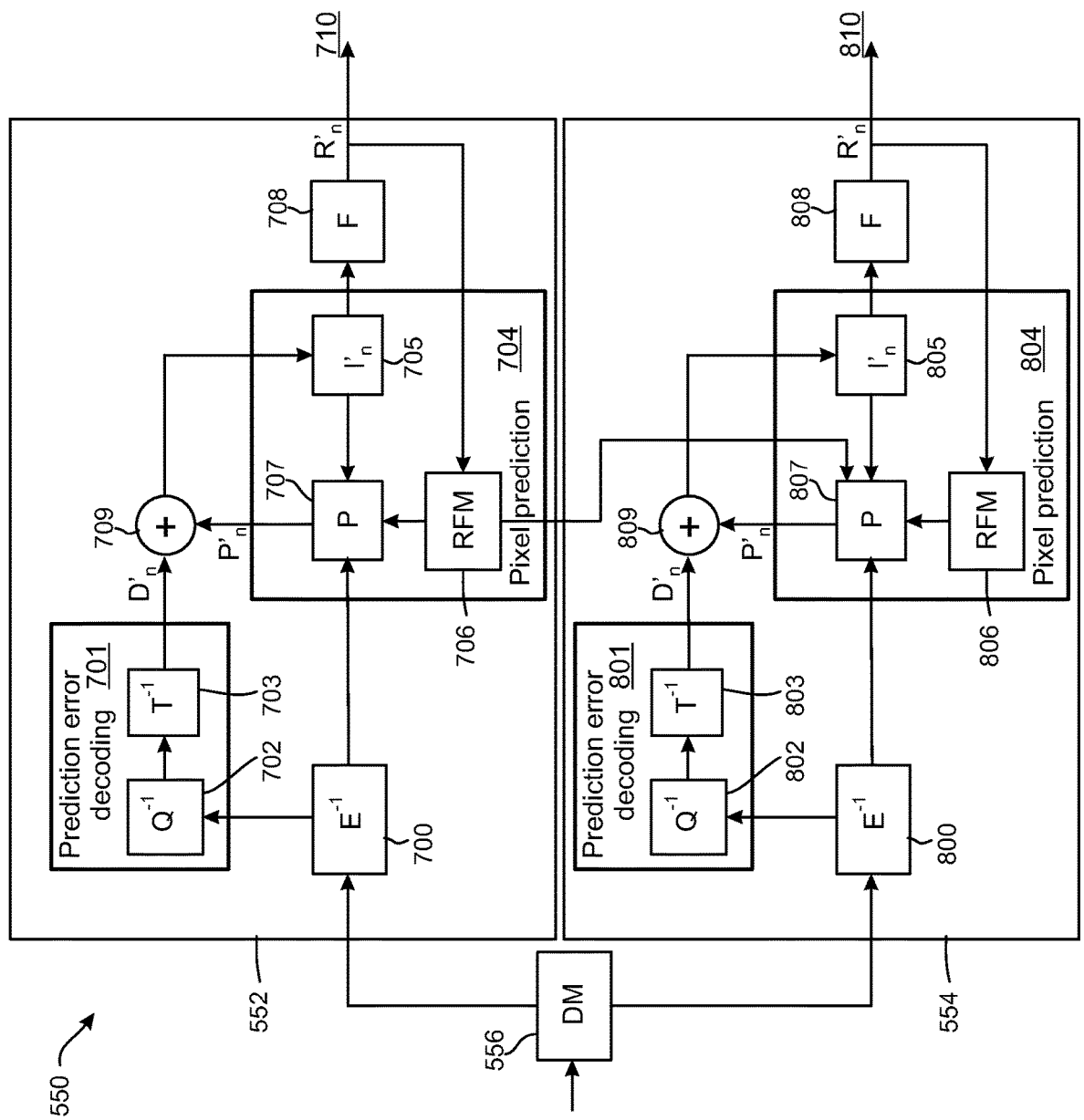
FIG. 3b shows a schematic diagram of a decoder suitable for implementing embodiments of the invention.

FIG. 2c is a flowchart illustrating a decoding method according to another embodiment. The method comprises receiving 164 an intra random access picture. It may then be examined 165 whether the IRAP picture can be re-used and if so, it is further examined 167 whether the IRAP picture has already be stored into the memory. If the IRAP picture has not been stored into the memory or is not available for decoding for some other reason, the IRAP picture is stored 168 into the memory. The method may further comprise requesting 169 byte ranges of the next Media (Sub)segment excluding the reusable IRAP picture.

Figure 4A:
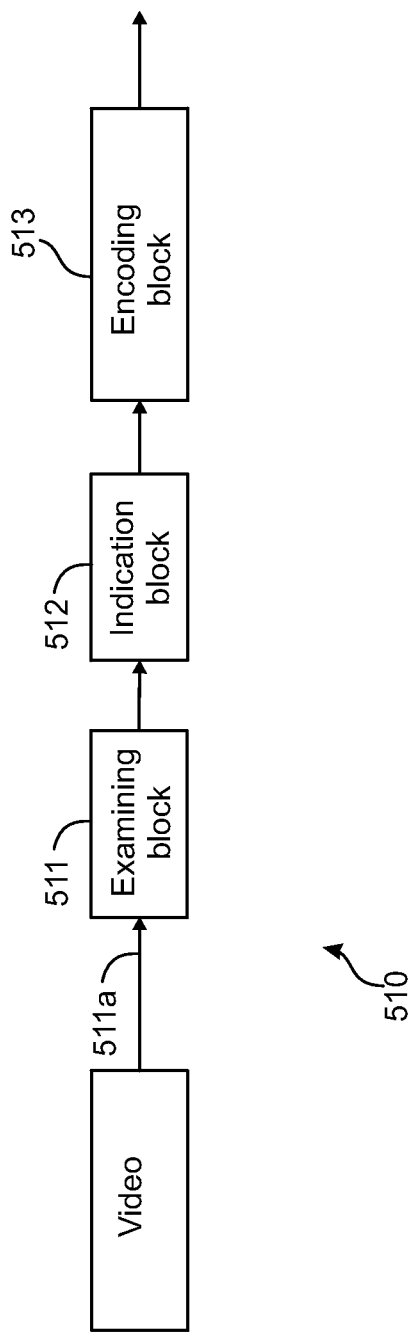
FIG. 4a shows some elements of a video encoding section, in accordance with an embodiment.

FIG. 4a shows some elements of a video encoding section 510, in accordance with an embodiment. An examining block 511 may comprise an input 511a to obtain video for encoding. The examining block 511 examines whether an IRAP picture is reusable and if so, an indication block 512 associates an indication with the IRAP picture that it is a reusable IRAP picture. The indication, the picture and possibly other information are provided to an encoding block 513. The encoding block 513 may encode the signals as well as the video for storing and/or transmission. However, there may be separate encoding elements for signal encoding and visual information encoding.

Figure 4B:
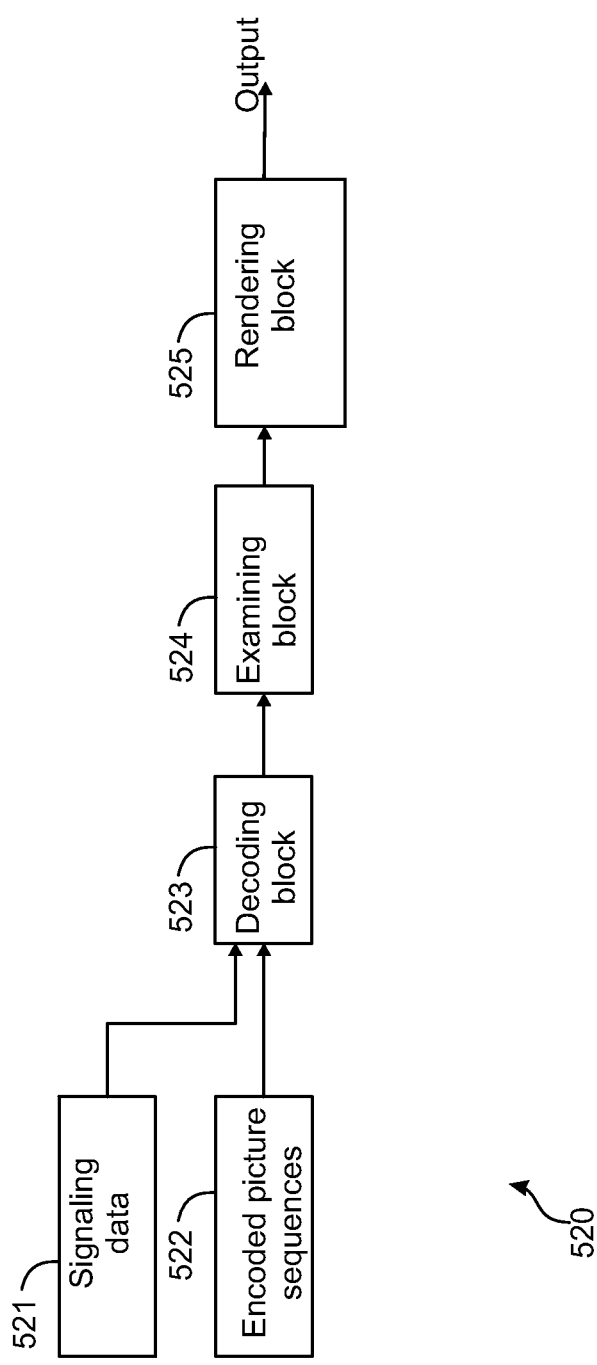
FIG. 4b shows a video decoding section, in accordance with an embodiment.

FIG. 4b shows a video decoding section 520, in accordance with an embodiment. The video decoding section 520 may obtain signaling data via a first input 521 and encoded visual information (e.g. the IRAP pictures) via a second input 522. The signaling data and the encoded visual information may be decoded by a decoding block 523. Decoded signaling data may be used by an examining block 524 to examine inter alia whether an IRAP picture should be requested, received, stored, and/or decoded; or whether an IRAP picture should be replaced by a corresponding, previously received IRAP picture. Decoded video data may be used by a rendering block 525 to reconstruct video from the decoded video data.

Figure 5:
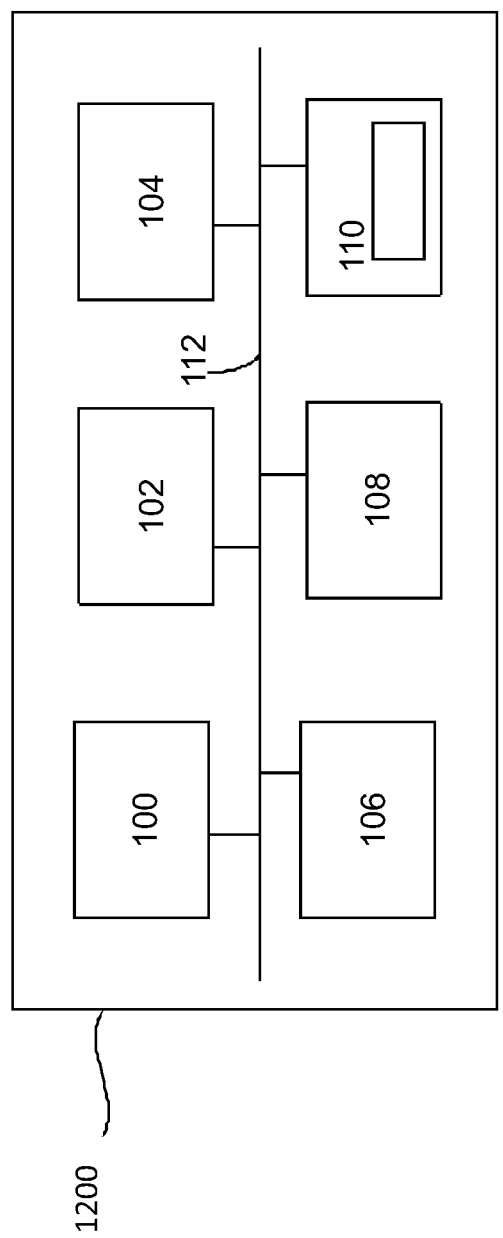
FIG. 5 shows an apparatus according to an embodiment.

An example of an apparatus, e.g. an apparatus for encoding and/or decoding, is illustrated in FIG. 5. The generalized structure of the apparatus will be explained in accordance with the functional blocks of the system. Several functionalities can be carried out with a single physical device, e.g. all calculation procedures can be performed in a single processor if desired. A data processing system of an apparatus according to an example of FIG. 5 comprises a main processing unit 100, a memory 102, a storage device 104, an input device 106, an output device 108, and a graphics subsystem 110, which are all connected to each other via a data bus 112.

The main processing unit 100 may be a conventional processing unit arranged to process data within the data processing system. The main processing unit 100 may comprise or be implemented as one or more processors or processor circuitry. The memory 102, the storage device 104, the input device 106, and the output device 108 may include conventional components as recognized by those skilled in the art. The memory 102 and storage device 104 store data in the data processing system 100. Computer program code resides in the memory 102 for implementing, for example, the methods according to embodiments. The input device 106 inputs data into the system while the output device 108 receives data from the data processing system and forwards the data, for example to a display. The data bus 112 is a conventional data bus and while shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system comprises receiving data units, the data units being logically separated to a first bitstream and a second bitstream, combining the first bitstream and the second bitstream into a merged bitstream, wherein the combining comprises, writing a delimiter into the merged bitstream, the delimiter indicating which of the first or second bitstream one or more data units associated with the delimiter in the merged bitstream are assigned.

If desired, the different functions discussed herein may be performed in a different order and/or concurrently with other. Furthermore, if desired, one or more of the above-described functions and embodiments may be optional or may be combined.

In the above, where the example embodiments have been described with reference to an encoder, it needs to be understood that the resulting bitstream and the decoder may have corresponding elements in them.

Likewise, where the example embodiments have been described with reference to a decoder, it needs to be understood that the encoder may have structure and/or computer program for generating the bitstream to be decoded by the decoder.

In the above, where the example embodiments have been described with reference to syntax and semantics or with reference to indications or signals in or along a bitstream, it needs to be understood that the embodiments likewise cover an encoder that outputs a bitstream portion according to the syntax and semantics or that outputs indications or signals in or along a bitstream. Likewise, the embodiments likewise cover a decoder that decodes a bitstream portion according to the syntax and semantics or decodes or interprets indications or signals in or along a bitstream.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although some embodiments of the invention describe codec operation within an apparatus, it would be appreciated that the invention as defined in the claims may be implemented as part of any video codec within any system or environment. Thus, for example, embodiments of the invention may be implemented in a video codec which may implement video coding over fixed or wired communication paths.

In the above, where the example embodiments have been described with reference to ISOBMFF, it needs to be understood that embodiments likewise apply to other container file formats, such as Matroska.

In the above, where the example embodiments have been described with reference to DASH MPD, it needs to be understood that embodiments likewise apply to other manifest formats, such as playlist format specified in IETF RFC 8216, and/or to other media description formats, such as the Session Description Protocol (SDP) specified in IETF RFC 4566.

Although various aspects of the embodiments are set out in the independent claims, other aspects comprise other combinations of features from the described embodiments and/or the dependent claims with the features of the independent claims, and not solely the combinations explicitly set out in the claims.

The invention claimed is:

1. A method comprising:
   obtaining an intra random access point picture from a first location of a coded video bitstream;
   determining whether the intra random access point picture is reusable in at least a second location of the coded video bitstream, wherein the at least second location differing from the first location; and
   providing an identification assigned with the intra random access point picture that the intra random access point picture is a reusable intra random access point picture, when the determining indicates that the intra random access point picture is reusable.

2. An apparatus comprising at least one processor and at least one non-transitory memory including computer program code, the memory and the computer program code configured to, with the at least one processor, cause the apparatus to perform at least the following:
   obtain an intra random access point picture from a first location of a coded video bitstream;
   determine whether the intra random access point picture is reusable in at least a second location of the coded video bitstream, wherein the at least second location differing from the first location; and
   provide an identification assigned with the intra random access point picture that the intra random access point picture is a reusable intra random access point picture, when the determining indicates that the intra random access point picture is reusable.

3. The apparatus according to claim 2, wherein the memory and the computer program code are further configured to cause the apparatus to:
   encode pictures to multiple layers, where each layer comprises one representation of the pictures; and
   include temporally correlated pictures into a same independent layer, wherein pictures within the independent layer are not predicted from pictures of other layers.

4. The apparatus according to claim 2, wherein the memory and the computer program code are further configured to cause the apparatus to:
   encode a picture starting a temporally contiguous sequence of coded pictures within an independent layer as a dependent random access point picture.

5. The apparatus according to claim 2, wherein the memory and the computer program code are further configured to cause the apparatus to:
   provide an identification or a control signal indicative of one or more of the following:
      independent layers are time-interleaved;
      output of the layers is intended to be done as a single picture sequence;
      constraint on a joint decoded picture buffer usage of the independent layers.

6. The apparatus according to claim 2, wherein the memory and the computer program code are further configured to cause the apparatus to:
   provide the identification in a supplemental enhancement information message in the coded video bitstream;
   provide the identification in a container file encapsulating the coded video bitstream;
   provide the identification in a timed metadata track associated with a media track encapsulating the coded video bitstream;

provide the identification in a random access segment encapsulating a temporally contiguous portion of the coded video bitstream; and provide the identification in a media description associated with container file, the media track, or the random access segment.

7. The apparatus according to claim 2, wherein the memory and the computer program code are further configured to cause the apparatus to encode one or more of the following in or linked to the identification:

an output flag containing a value in a slice header of the intra random access point picture indicative of whether the intra random access point picture is intended for as a reference for prediction and for output or only for reference for prediction; or byte range within a media segment.

8. The apparatus according to claim 2, wherein the memory and the computer program code are further configured to cause the apparatus to:

provide the identification as one of the following:
an identity value; or
a checksum of a coded picture content.

9. The method of claim 1, further comprising:

encoding pictures to multiple layers, where each layer comprises one representation of the pictures; and including temporally correlated pictures into a same independent layer, wherein pictures within the independent layer are not predicted from pictures of other layers.

10. The method of claim 1, further comprising:

encoding a picture starting a temporally contiguous sequence of coded pictures within an independent layer as a dependent random access point picture.

11. The method of claim 1, further comprising:

providing an identification or a control signal indicative of one or more of the following:

independent layers are time-interleaved;

output of the layers is intended to be done as a single picture sequence;

constraint on a joint decoded picture buffer usage of the independent layers.

12. The method of claim 1, further comprising:

providing the identification in a supplemental enhancement information message in the coded video bitstream;

providing the identification in a container file encapsulating the coded video bitstream;

providing the identification in a timed metadata track associated with a media track encapsulating the coded video bitstream;

providing the identification in a random access segment encapsulating a temporally contiguous portion of the coded video bitstream; and providing the identification in a media description associated with container file, the media track, or the random access segment.

13. The method of claim 1, further comprising:

encoding one or more of the following in or linked to the identification:

an output flag containing a value in a slice header of the intra random access point picture indicative of whether the intra random access point picture is intended for as a reference for prediction and for output or only for reference for prediction; or byte range within a media segment.

14. A non-transitory computer-readable medium comprising program instructions stored thereon for performing at least the following:

causing obtaining of an intra random access point picture from a first location of a coded video bitstream;

determining whether the intra random access point picture is reusable in at least a second location of the coded video bitstream, wherein the at least second location differing from the first location; and causing providing of an identification assigned with the intra random access point picture that the intra random access point picture is a reusable intra random access point picture, when the determining indicates that the intra random access point picture is reusable.

* * * * *